(12) United States Patent
Bansal et al.

(10) Patent No.: US 10,733,064 B2
(45) Date of Patent: Aug. 4, 2020

(54) EFFICIENT RESTORE OF SYNTHETIC FULL BACKUP BASED VIRTUAL MACHINES THAT INCLUDE USER CHECKPOINTS

(71) Applicant: EMC IP Holding Company LLC, Hopkinton, MA (US)

(72) Inventors: Aaditya Bansal, Bangalore (IN); Shelesh Chopra, Bangalore (IN); Soumen Acharya, Bangalore (IN); Sunil Yadav, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 158 days.

(21) Appl. No.: 16/041,967

(22) Filed: Jul. 23, 2018

(65) Prior Publication Data
US 2020/0026618 A1    Jan. 23, 2020

(51) Int. Cl.
*G06F 9/455*   (2018.01)
*G06F 11/14*   (2006.01)

(52) U.S. Cl.
CPC ...... *G06F 11/1469* (2013.01); *G06F 9/45558* (2013.01); *G06F 2009/45583* (2013.01); *G06F 2201/84* (2013.01)

(58) Field of Classification Search
None
See application file for complete search history.

*Primary Examiner* — Gregory A Kessler
(74) *Attorney, Agent, or Firm* — Chamberlain, Hrdlicka, White, Williams & Aughtry

(57) ABSTRACT

A method and system for efficiently restoring synthetic full backup based virtual machines that include user checkpoints. Specifically, the method and system disclosed herein overcome a behavioral limitation exhibited in present virtual machine backup methodologies, where said methodologies ignore the presence of user checkpoints storing state for a virtual machine. In accounting for the user checkpoints while recovering a virtual machine, embodiments of the invention maintain restoration points for virtual machine state instantiated by the user, in addition to those instantiated by the system.

20 Claims, 17 Drawing Sheets

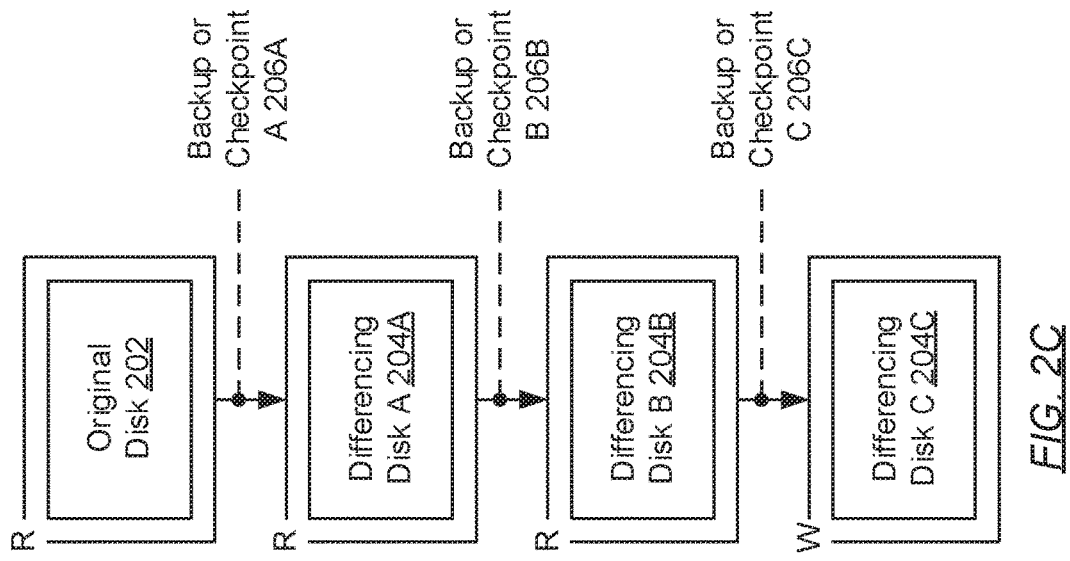
FIG. 2C
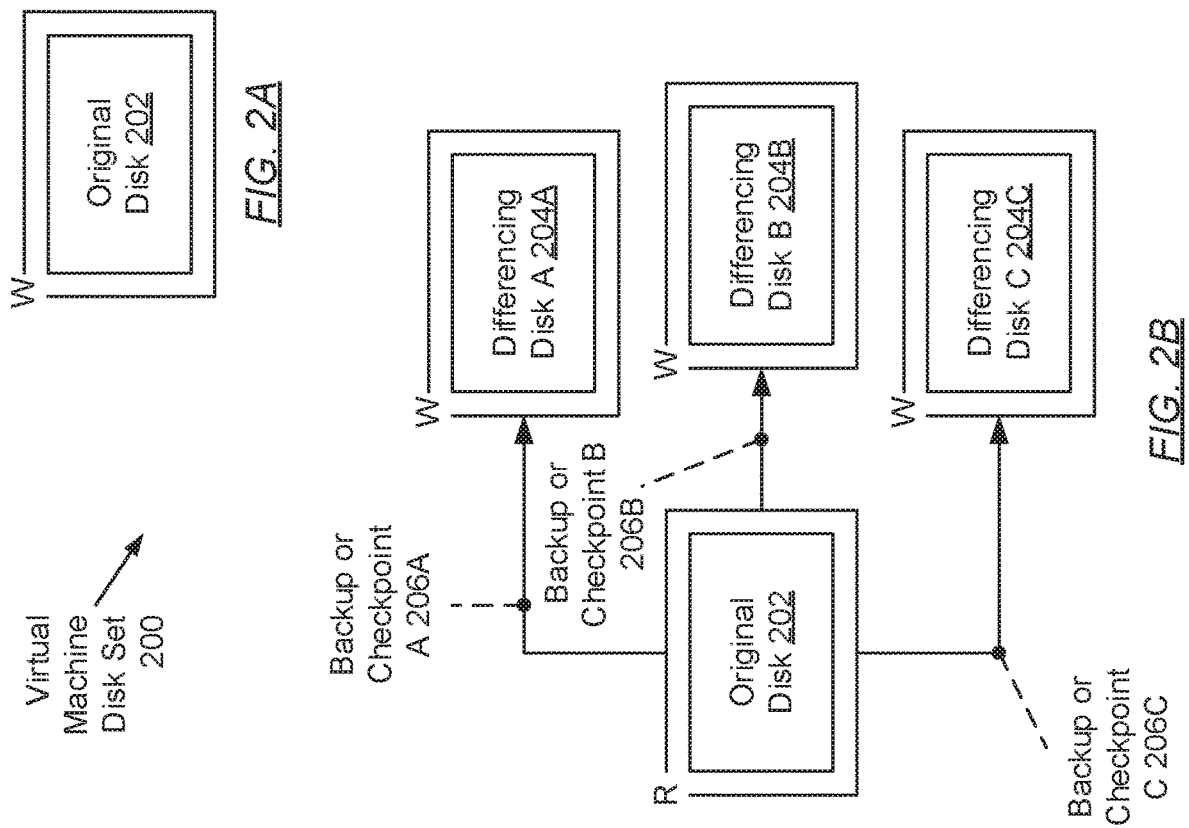
FIG. 2A
FIG. 2B

EFFICIENT RESTORE OF SYNTHETIC FULL BACKUP BASED VIRTUAL MACHINES THAT INCLUDE USER CHECKPOINTS

BACKGROUND

User checkpoints, with respect to virtual machines, allow users to create saved states for a virtual machine at any time to mitigate critical failures of the virtual machine on account of any changes to the virtual machine. Further, the presence of these checkpoints create a chain of tracking (or differencing) disks, which capture the successive saved states of the virtual machine.

BRIEF DESCRIPTION OF DRAWINGS

FIGS. 2A-2C show various configurations of a virtual machine disk set in accordance with one or more embodiments of the invention.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-9C, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to efficiently restoring synthetic full backup based virtual machines that include user checkpoints. Specifically, one or more embodiments of the invention overcome a behavioral limitation exhibited in present virtual machine backup methodologies, where said methodologies ignore the presence of user checkpoints storing state for a virtual machine. In accounting for the user checkpoints while recovering a virtual machine, embodiments of the invention maintain restoration points for virtual machine state instantiated by the user, in addition to those instantiated by the system.

Figure 1A:
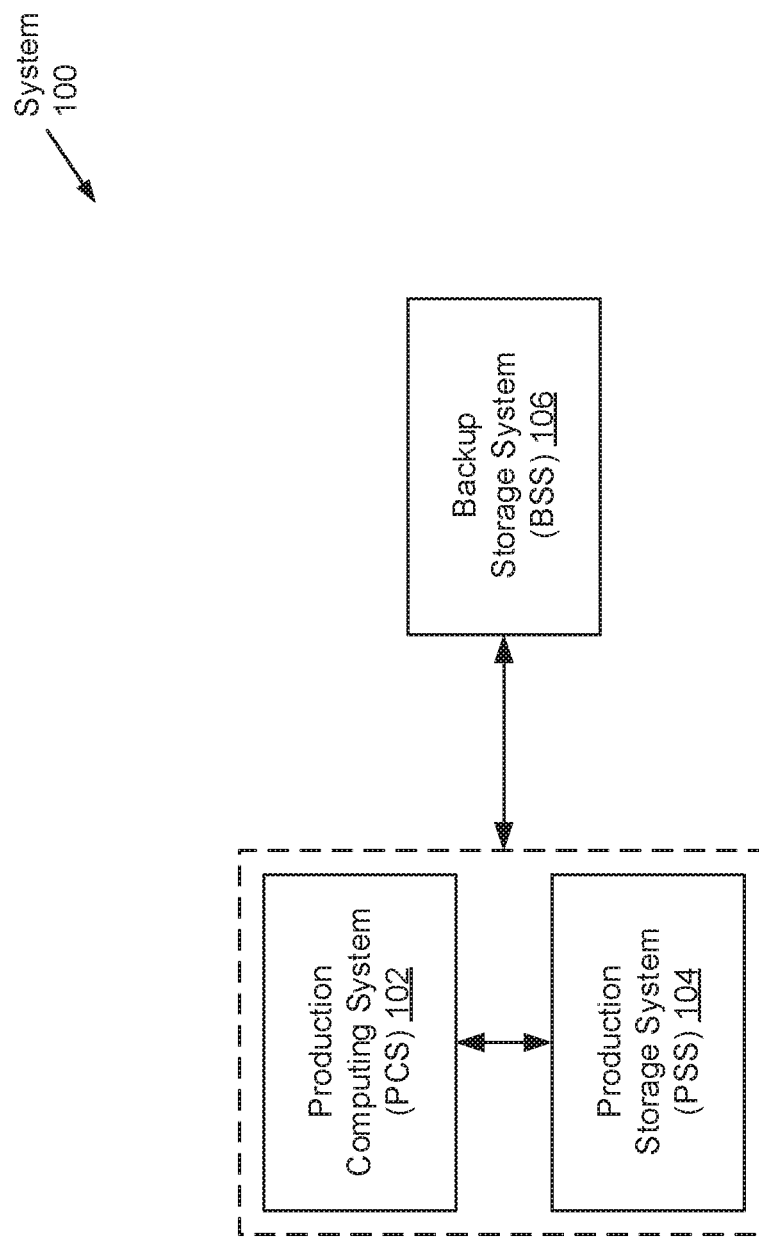
FIG. 1A shows a system in accordance with one or more embodiments of the invention.

FIG. 1A shows a system in accordance with one or more embodiments of the invention. The system (100) may include a production computing system (PCS) (102) operatively connected to a production storage system (PSS) (104). The system (100) may further include a backup storage system (BSS) (106) operatively connected to the PCS (102) and the PSS (104). Each of these components is described below.

In one embodiment of the invention, the aforementioned components may be directly or indirectly connected to one another through a network (e.g., a local area network (LAN), a wide area network (WAN) such as the Internet, a mobile network, or any other network) (not shown). The network may be implemented using any combination of wired and/or wireless connections. In embodiments in which the aforementioned components are indirectly connected, there may be other networking components or systems (e.g., switches, routers, gateways, etc.) that facilitate communication, information exchange, and/or resource sharing. Further, the aforementioned components may communicate with one another using any combination of wired and/or wireless communication protocols.

In one embodiment of the invention, the PCS (102) may be any computing system (see e.g., FIG. 8) used for various applications. These applications may, for example, require large-scale and complex data processing. In one embodiment of the invention, the PCS (102) may be any computing system that may serve multiple users concurrently. Further, the PCS (102) may be programmed to provide and manage the allocation of computing resources (e.g., computer processors, memory, persistent and non-persistent storage, network bandwidth, etc.) towards the execution of various processes (or tasks) that may be instantiated thereon. Examples of the PCS (102) include, but are not limited to, one or more: desktop computers, laptop computers, smartphones, tablet computers, gaming consoles, servers, mainframes, or any combination thereof. The PCS (102) is described in further detail below with respect to FIG. 1B.

In one embodiment of the invention, the PSS (104) may represent a physical storage array encompassing one or more physical storage devices and/or media on which various forms of information, pertinent to the PCS (102), may be consolidated. The one or more physical storage devices and/or media may or may not be of the same type. Further, information consolidated in the PSS (104) may be arranged using any storage mechanism (e.g., a filesystem, a collection of tables or records, etc.). In one embodiment of the invention, the PSS (104) may be implemented using persistent (i.e., non-volatile) storage. Examples of persistent storage include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM). The PSS (104) is described in further detail below with respect to FIG. 1B.

In one embodiment of the invention, the BSS (106) may refer to a data backup, archiving, and/or disaster recovery storage system. The BSS (106) may be implemented using one or more servers (not shown). Each server may be a physical server (i.e., which may reside in a datacenter) or a virtual server (i.e., which may reside in a cloud computing environment). In one embodiment of the invention, the BSS (106) may be implemented on one or more computing systems similar to the exemplary computing system shown in FIG. 8. Further, the BSS (106), at least in part, may incorporate a physical storage array encompassing one or more physical storage devices and/or media on which replicas of various form of information, pertinent to the PCS (102), may be consolidated. The one or more physical storage devices and/or media may or may not be of the same type. Moreover, information consolidated in the BSS (106) may be arranged using any storage mechanism (e.g., a filesystem, a collection of tables or records, etc.). In one embodiment of the invention, the BSS (106) may be implemented using persistent (i.e., non-volatile) storage. Examples of persistent storage include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM). The BSS (106) is described in further detail below with respect to FIG. 1C.

While FIG. 1 shows a configuration of components, other system configurations may be used without departing from the scope of the invention.

Figure 1B:
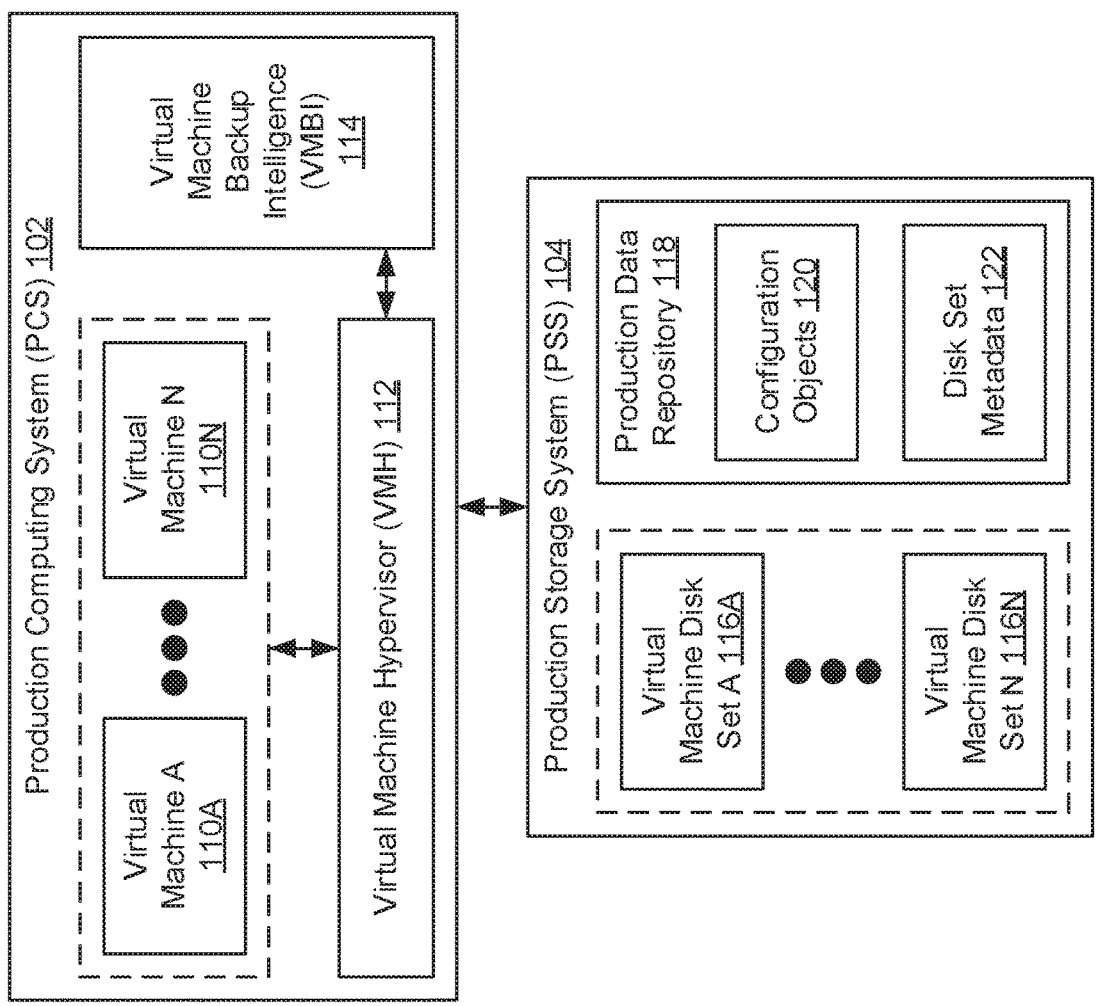
FIG. 1B shows a production computing system and a production storage system in accordance with one or more embodiments of the invention.

FIG. 1B shows a production computing system (PCS) and production storage system (PSS) in accordance with one or more embodiments of the invention. The PCS (102) may include one or more virtual machines (110A-110N), a virtual machine hypervisor (VMH) (112), and a virtual machine backup intelligence (VMBI) (114). Further, the PSS (104) may include one or more virtual machine disk sets (116A-116N) and a production data repository (118). Each of these components is described below.

In one embodiment of the invention, each virtual machine (110A-110N) may be a computer program that executes on the underlying hardware of the PCS (102). Specifically, each virtual machine (110A-110N) may be a computer program that emulates a physical computing system (see e.g., FIG. 8) and, thus, provides a self-contained execution environment on which one or more other computer programs (e.g., guest operating systems (OSs) and/or applications) may execute. Further, each virtual machine (110A-110N) may access the underlying PCS (102) hardware and interact with other PCS (102) components and the PSS (104) using an abstraction layer—e.g., the VMH (112). Moreover, each virtual machine (110A-110N) may include functionality to submit disk input-output (IO) operations directed to reading data from and writing data to a corresponding virtual machine disk set (116A-116N) residing on the PSS (104).

In one embodiment of the invention, the VMH (112) may be a computer program or process (i.e., an instance of a computer program) that executes on the underlying hardware of the PCS (102). Specifically, the VMH (112) may be a computer program or process tasked with the management of one or more virtual machines (110A-110N). To that extent, the VMH (112) may include functionality to: create or delete virtual machines (110A-110N); allocate or deallocate PCS (102) resources to support the execution of the virtual machines (110A-110N) and their respective workloads; and manage communications between the virtual machines (110A-110N) and other PCS (102) components (e.g., the VMBI (114)), as well as between the virtual machines (110A-110N) and the PSS (104). One of ordinary skill will appreciate that the VMH (112) may perform other functionalities without departing from the scope of the invention.

In one embodiment of the invention, the VMBI (114) may be a computer program or process (i.e., an instance of a computer program) that executes on the underlying hardware of the PCS (102). Specifically, the VMBI (114) may be a computer program or process tasked with, at least in part, managing virtual machine backup and recovery operations. To that extent, the VMBI (114) may include functionality to: create checkpoints (described below) in accordance with embodiments of the invention (see e.g., FIGS. 4A and 4B); and create virtual machine backups in accordance with embodiments of the invention (see e.g., FIGS. 5A and 5B). One of ordinary skill will appreciate that the VMBI (114) may perform other functionalities without departing from the scope of the invention.

In one embodiment of the invention, each virtual machine disk set (116A-116N) may represent a collection of one or more virtual machine disks, which retain snapshots of state associated with a corresponding virtual machine (110A-110N) at various recovery points-in-time. That is, the cardinality of virtual machine disk sets (116A-116N) matches the cardinality of virtual machines (110A-110N), thus ensuring a one-to-one mapping between virtual machine disk sets (116A-116N) and virtual machines (110A-110N). Further, each virtual machine disk (not shown) of a virtual machine disk set (116A-116N) may be a logical container, a data object, or a data structure that stores virtual machine state. Moreover, each virtual machine disk (not shown) may span across one or more physical storage devices and/or media that implement, at least in part, the PSS (104). Various configurations of a virtual machine disk set are described in further detail below with respect to FIGS. 2A-2C.

In one embodiment of the invention, the production data repository (118) may represent a logical partition of the PSS (104) used for consolidating various forms of information pertinent to the PCS (102). The production data repository (118) may span one or more physical storage devices and/or media that implement, at least in part, the PSS (102). Further, information consolidated in the production data repository (118) may be arranged using any storage mechanism (e.g., a filesystem, a collection of tables or records, etc.). Moreover, information stored in the production data repository (118) may include, but is not limited to: one or more configuration objects (120) and disk set metadata (122). Each of these items of information is described below.

In one embodiment of the invention, each configuration object (120) may refer to the primary configuration file for a corresponding virtual machine (110A-110N). That is, the cardinality of configuration objects (120) matches the cardinality of virtual machines (110A-110N), thus ensuring a one-to-one mapping between configuration objects (120) and virtual machines (110A-110N). Further, each configuration object (120) may store or specify various settings pertinent to the operation of a corresponding virtual machine (110A-110N). These settings may include, but are not limited to, hardware configuration settings (e.g., PCS (102) resources (e.g., processors, memory, storage, network bandwidth, etc.) assigned to the virtual machine (110A-110N)), power management settings, and optional tools.

In one embodiment of the invention, each configuration object (120) may further store or specify a disk chain path directed to the configuration of a corresponding virtual machine disk set (116A-116N). A disk chain path may represent a linked chain of disk references, which captures the disk backup chain for state associated with a corresponding virtual machine (110A-110N). A disk backup chain, for a given virtual machine (110A-110N), may refer to a sequence of virtual machine disks, of the virtual machine disk set (116A-116N) for the virtual machine (110A-110N), that records the appropriate order in which initial information and changes to the given virtual machine (110A-110N) are sequenced. A disk reference, on the other hand, may refer to a statement of the location of a given virtual machine disk with respect to a hierarchy of directories. Said another way, a disk reference may refer to the pathname for a given virtual machine disk. An example disk backup chain is described in further detail below with respect to FIG. 3. Moreover, each configuration object (120) may be expressed in a binary format (i.e., where information therein is stored in the form of ones and zeros) or a non-binary format such as, for example, through the use of extensible markup language (XML).

In one embodiment of the invention, the disk set metadata (122) may encompass one or more sets of disk set metadata (122), where each set of disk set metadata (also disclosed herein as just disk set metadata) (122) pertains to a corresponding virtual machine disk set (116A-116N). That is, the cardinality of disk set metadata (122) matches the cardinality of virtual machine disk sets (116A-116N), thus ensuring a one-to-one mapping between disk set metadata (122) and virtual machine disk sets (116A-116N). Further, each disk set metadata (122) may store or specify various items of information that describe each virtual machine disk (not shown) specified in a corresponding virtual machine disk set (116A-116N).

In one embodiment of the invention, these various items of information may include, for example, byte offset information for the location of particular data blocks on the given virtual machine disk, disk size information indicating the size of the given virtual machine disk in bytes, parent disk information entailing a unique identifier associated with another virtual machine disk that serves as the parent disk from which the given virtual machine disk may depend, disk type information indicating whether the given virtual machine disk is a fixed, dynamic, or differential disk, checksum information, etc. In one embodiment of the invention, each disk set metadata (122) further store or specify descriptive information that indicates whether each given virtual machine disk, of the corresponding virtual machine disk set (116A-116N), had been created as a result of a backup operation or a checkpoint, and if the latter, whether the checkpoint is a system checkpoint or a user checkpoint (described below).

Figure 1C:
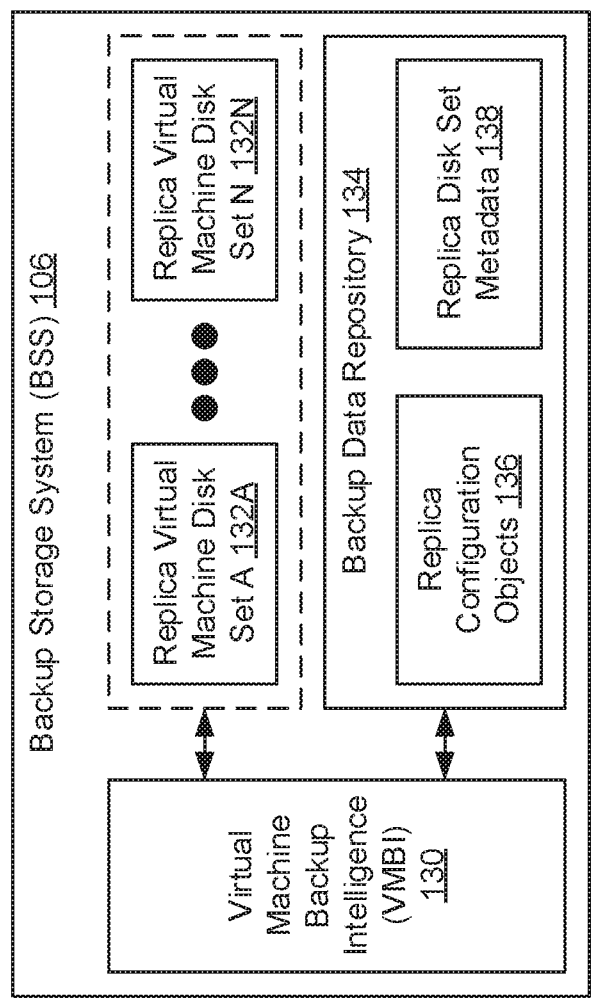
FIG. 1C shows a backup storage system in accordance with one or more embodiments of the invention.

FIG. 1C shows a backup storage system (BSS) in accordance with one or more embodiments of the invention. The BSS (106) may include a virtual machine backup intelligence (VMBI) (130) (i.e., a counterpart to the VMBI residing on the PCS (see e.g., FIG. 1B)), one or more replica virtual machine disk sets (132A-132N), and a backup data repository (134). Each of these components is described below.

In one embodiment of the invention, the VMBI (130) may be a computer program or process (i.e., an instance of a computer program) that executes on the underlying hardware of the BSS (106). Specifically, the VMBI (130) may be a computer program or process tasked with, at least in part, managing virtual machine backup and recovery operations. To that extent, the VMBI (130) may include functionality to: consolidate virtual machine backups in accordance with embodiments of the invention (see e.g., FIGS. 6A and 6B); and restore virtual machines in accordance with embodiments of the invention (see e.g., FIGS. 7A and 7B). One of ordinary skill will appreciate that the VMBI (130) may perform other functionalities without departing from the scope of the invention.

In one embodiment of the invention, each replica virtual machine disk set (132A-132N) may be a copy of a corresponding virtual machine disk set (116A-116N) that resides on the production storage system (PSS) (104) (see e.g., FIG. 1B). Subsequently, each replica virtual machine disk set (132A-132N) may represent a collection of one or more replica virtual machine disks, which retain copies of snapshots of state associated with a corresponding virtual machine (110A-110N) at various recovery points-in-time. That is, the cardinality of replica virtual machine disk sets (132A-132N) matches the cardinality of virtual machines (110A-110N) and the cardinality of virtual machine disk sets (116A-116N), thus ensuring a one-to-one mapping between replica virtual machine disk sets (132A-132N) and virtual machines (110A-110N), as well as between replica virtual machine disk sets (132A-132N) and virtual machine disk sets (116A-116N). Further, each replica virtual machine disk (not shown) of a replica virtual machine disk set (132A-132N) may be a logical container, a data object, or a data structure that stores copies of virtual machine state. Moreover, each replica virtual machine disk (not shown) may span across one or more physical storage devices and/or media that implement, at least in part, the BSS (106). Various configurations of a replica virtual machine disk set are described in further detail below with respect to FIGS. 2A-2C.

In one embodiment of the invention, the backup data repository (134) may represent a logical partition of the BSS (106) used for consolidating copies of various forms of information pertinent to the production computing system (PCS) (102) (see e.g., FIG. 1B). The backup data repository (134) may span one or more physical storage devices and/or media that implement, at least in part, the BSS (106). Further, information consolidated in the backup data repository (134) may be arranged using any storage mechanism (e.g., a filesystem, a collection of tables or records, etc.). Moreover, information stored in the backup data repository (134) may include, but is not limited to: one or more replica configuration objects (136) and replica disk set metadata (138). Each of these items of information is described below.

In one embodiment of the invention, each replica configuration object (136) may be a copy of a corresponding configuration object (120) that resides on the PSS (104). Subsequently, each replica configuration object (136) may refer to a copy of the primary configuration file for a corresponding virtual machine (110A-110N). That is, the cardinality of replica configuration objects (136) matches the cardinality of virtual machines (110A-110N) and the cardinality of configuration objects (120), thus ensuring a one-to-one mapping between replica configuration objects (136) and virtual machines (110A-110N), as well as between replica configuration objects (136) and configuration objects (120). Further, each replica configuration object (136) may store or specify various settings pertinent to the operation of a corresponding virtual machine (110A-110N). These settings may include, but are not limited to, hardware configuration settings (e.g., PCS (102) resources (e.g., processors, memory, storage, network bandwidth, etc.) assigned to the virtual machine (110A-110N)), power management settings, and optional tools.

In one embodiment of the invention, each replica configuration object (136) may further store or specify a disk chain path directed to the configuration of a corresponding replica virtual machine disk set (132A-132N). A disk chain path may represent a linked chain of disk references, which captures the disk backup chain for state associated with a corresponding virtual machine (110A-110N). A disk backup chain, for a given virtual machine (110A-110N), may refer to a sequence of virtual machine disks, of the virtual machine disk set (116A-116N) or replica virtual machine disk set (132A-132N) for the virtual machine (110A-110N), that records the appropriate order in which initial information and changes to the given virtual machine (110A-110N) are sequenced. A disk reference, on the other hand, may refer to a statement of the location of a given replica virtual machine disk with respect to a hierarchy of directories. Said another way, a disk reference may refer to the pathname for a given replica virtual machine disk. An example disk backup chain is described in further detail below with respect to FIG. 3. Moreover, each replica configuration object (136) may be expressed in a binary format (i.e., where information therein is stored in the form of ones and zeros) or a non-binary format such as, for example, through the use of extensible markup language (XML).

In one embodiment of the invention, the replica disk set metadata (138) may encompass one or more sets of replica disk set metadata (138), where each set of replica disk set metadata (also disclosed herein as just replica disk set metadata) (138) pertains to a corresponding replica virtual machine disk set (132A-132N). That is, the cardinality of replica disk set metadata (138) matches the cardinality of replica virtual machine disk sets (132A-132N), thus ensuring a one-to-one mapping between replica disk set metadata (138) and replica virtual machine disk sets (132A-132N). Further, each replica disk set metadata (138) may store or specify various items of information that describe each replica virtual machine disk (not shown) specified in a corresponding replica virtual machine disk set (132A-132N).

In one embodiment of the invention, these various items of information may include, for example, byte offset information for the location of particular data blocks on the given replica virtual machine disk, disk size information indicating the size of the given replica virtual machine disk in bytes, parent disk information entailing a unique identifier associated with another replica virtual machine disk that serves as the parent disk from which the given replica virtual machine disk may depend, disk type information indicating whether the given replica virtual machine disk is a fixed, dynamic, or differential disk, checksum information, etc. In one embodiment of the invention, each replica disk set metadata (138) further store or specify descriptive information that indicates whether each given replica virtual machine disk, of the corresponding replica virtual machine disk set (132A-132N), had been created as a result of a backup operation or a checkpoint, and if the latter, whether the checkpoint is a system checkpoint or a user checkpoint (described below).

FIGS. 2A-2C show various configurations of a virtual machine disk set in accordance with one or more embodiments of the invention. A first virtual machine disk set (200) configuration is portrayed through FIG. 2A, which may exemplify an initial configuration of virtual machine disks for any given virtual machine upon creation of the virtual machine. This first virtual machine disk set (200) configuration includes but one virtual machine disk—i.e., an original disk (202). The original disk (202) may refer to a virtual machine disk that stores or specifies any and all virtual machine state existing prior to the occurrence of a first backup operation or the creation of a first checkpoint. Further, the original disk (202) may be considered the root virtual machine disk from which all other subsequent virtual machine disks (see e.g., FIGS. 2B and 2C), if any, depend. Moreover, as the sole virtual machine disk in this first virtual machine disk set (200) configuration, the original disk (202) may operate as a readable and writable (RW) virtual machine disk.

A second virtual machine disk (200) configuration is portrayed through FIG. 2B, which may exemplify a parallelized configuration of virtual machine disks for any given virtual machine. The second virtual machine disk set (200) configuration includes multiple differencing disks (204A-204C), which form multiple branches, parallel to one another, stemming from an original disk (202). In this second virtual machine disk set (200) configuration, each differencing disk (204A-204C) represents a virtual machine disk that stores or specifies unique changes to virtual machine state that had been stored/specified on the original disk (202). That is, a first differencing disk (204A) may store/specify a first set of changes to virtual machine state representative of the original disk (202); a second differencing disk (204B) may store/specify a second set of changes (irrespective of the first set of changes) to virtual machine state representative of the original disk (202); and a third differencing disk (204C) may store/specify a third set of changes (irrespective of the first and second sets of changes) to virtual machine state representative of the original disk (202).

Further, in one embodiment of the invention, each differencing disk (204A-204C) maintains a parent-child relationship with the original disk (202), where the original disk (202), from which each differencing disk (204A-204C) depends, serves as the parent disk while each differencing disk (204A-204C), which maintains changes therefrom, serves as a child disk. Moreover, upon creation of a child disk (e.g., each differencing disk (204A-204C)), the corresponding parent disk (e.g., the original disk (202)) to the child disk may transition from a readable-writable (RW) virtual machine disk (see e.g., FIG. 2A) to a read-only (RO) virtual machine disk. Meanwhile, the child disk initializes as a readable-writable (RW) virtual machine disk. In this fashion, virtual machine state representative of the original disk (202) becomes locked, while the virtual machine state representative of the child disk (204A-204C) assumes any changes performed thereinafter.

In addition, in one embodiment of the invention, a child disk (e.g., each differencing disk (204A-204C)) may be created from the aftermath of either the occurrence of a backup operation or the creation of a checkpoint (206A-206C). A backup operation may refer to a state preservation event entailing: (a) replication of the current virtual machine state of an active (i.e., readable-writable) virtual machine disk; and (b) the subsequent consolidation of the replicated current virtual machine state onto a remote storage system (e.g., the backup storage system (BSS) (see e.g., FIG. 1C)). Further, a backup operation may either generate a full backup or an incremental backup. A full backup entails replicating and consolidating a copy of all virtual machine state, configurations, and/or metadata associated with a corresponding virtual machine. An incremental backup, on the other hand, entails replicating and consolidating a copy of merely changes to the virtual machine state, configurations, and/or metadata associated with a corresponding virtual machine that has incurred since the last (or previous) backup operation. Backup operations in accordance with embodiments of the invention are described in further detail below with respect to FIGS. 5A-6B.

Moreover, in one embodiment of the invention, a checkpoint may represent a recovery point-in-time from where a previous virtual machine state may be restored. For example, should changes to virtual machine state (i.e., representative of, for example, a differencing disk (204A-204C)) lead to the inoperability of the corresponding virtual machine, a user may opt to revert the current virtual machine state to a previous virtual machine state (i.e., representative of, for example, the original disk (202)), marked by a respective checkpoint (206A-206C), where the changes that had led to the inoperability are undone. In this disclosure, two checkpoint types are described—i.e., a system checkpoint and a user checkpoint. A system checkpoint may refer to a checkpoint that may be created automatically by an intelligence executing on the PCS (102) such as, for example, the VMBI (114) residing thereon. Subsequently, the creation of system checkpoints may be triggered based on a predetermined schedule followed by the VMBI (114). Alternatively, a user checkpoint may refer to a checkpoint that may be created manually by a user of the PCS (102). Accordingly, the creation of user checkpoints may be triggered at the discretion of the user. Checkpoint creation in accordance with embodiments of the invention is described in further detail below with respect to FIGS. 4A and 4B.

Returning to virtual machine disk set (200) configurations, a third virtual machine disk set (200) configuration is portrayed through FIG. 2C, which may exemplify a sequential configuration of virtual machine disks for any given virtual machine. The third virtual machine disk set (200) configuration includes multiple differencing disks (204A-204C), which collectively form a single branch originating from an original disk (202). In this third virtual machine disk set (200) configuration, each differencing disk (204A-204C) represents a virtual machine disk that stores or specifies changes to virtual machine state that had been stored/specified on a previous (or parent) disk along the branch. That is, a first differencing disk (204A) may store/specify a set of changes to virtual machine state representative of the original disk (202); a second differencing disk (204B) may store/specify a set of changes to virtual machine state representative of the first differencing disk (204A); and a third differencing disk (204C) may store/specify a set of changes to virtual machine state representative of the second differencing disk (204B).

Further, in one embodiment of the invention, each differencing disk (204A-204C) maintains a parent-child relationship with either the original disk (202) or another differencing disk (204A, 204B). Each differencing disk (204A-204C), again, may be created from the aftermath of either the occurrence of a backup operation or the creation of a checkpoint (206A-206C). Moreover, in this third virtual machine disk set (200) configuration, the latest (or most recently) created differencing disk (204C) operates as a readable-writable (RW) virtual machine disk, whereas the remaining (parent) disks (i.e., the original disk (202) as well as the first and second differencing disks (204A, 204B)) operate as read-only (RO) virtual machine disks.

Figure 3:
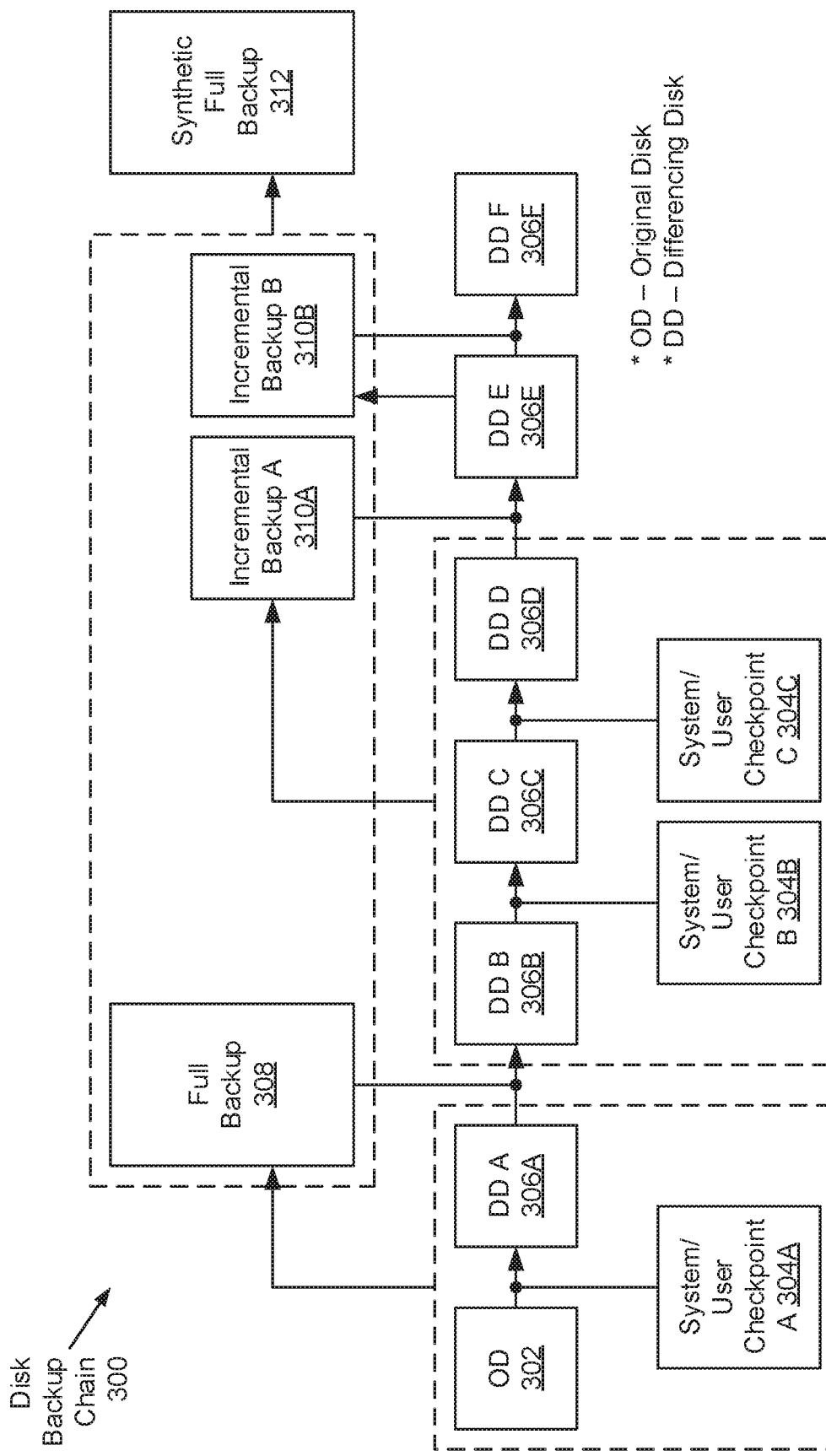
FIG. 3 shows an example disk backup chain in accordance with one or more embodiments of the invention.

FIG. 3 shows an example disk backup chain in accordance with one or more embodiments of the invention. As mentioned above, a disk backup chain, for a given virtual machine, may refer to a sequence of virtual machine disks that records the appropriate order in which initial information and changes to the given virtual machine are sequenced to guarantee a proper restoration of the virtual machine. The exemplified disk backup chain (300) includes, as the sequence of virtual machine disks, an original disk (302) followed by multiple differencing disks (306A-306F) presented in a sequential virtual machine disk set configuration (see e.g., FIG. 2C). Prior to the instantiation of each differencing disk (306A-306F), an event—i.e., either a backup operation or a checkpoint—transpires that leads to their creation. For example, (a) the first differencing disk (306A) may be created from the aftermath of a first system or user checkpoint (304A) (described above); (b) the second differencing disk (306B) may be created from the aftermath of a full backup operation (308); (c) the third differencing disk (306C) may be created from the aftermath of a second system or user checkpoint (304B); (d) the fourth differencing disk (306D) may be created from the aftermath of a third system or user checkpoint (304C); (e) the fifth differencing disk (306E) may be created from the aftermath of a first incremental backup operation (310A); and (f) the sixth differencing disk (306F) may be crated from the aftermath of a second incremental backup operation (310B).

Further, in one embodiment of the invention, each backup operation, for a given virtual machine, may replicate and consolidate virtual machine state representative of one or more virtual machine disks of the given virtual machine. For example, the exemplified full backup operation (308) may encompass virtual machine state representative of the original disk (302) and the first differencing disk (306A). Typically, the first backup operation performed for any given virtual machine must be a full backup operation (308), which may entail virtual machine state representative of at least the original disk (302) and, if any, one or more differencing disks. By way of another example, the exemplified first incremental backup operation (310A) may encompass virtual machine state representative of the second, third, and fourth differencing disks (306B-306D), whereas the exemplified second incremental backup operation (310B) may encompass virtual machine state representative of the fifth differencing disk (306E).

Moreover, in one embodiment of the invention, the merging of replicated virtual machine state, representative of two or more virtual machine disks, may result in the formation of a synthetic full backup (312). Specifically, a synthetic full backup (312) may refer to a synthesized full backup, which incorporates virtual machine state of a latest (or previous) full backup (308) along with virtual machine state of a series of one or more incremental backups (310A, 310B) that follow the full backup (308), to obtain a new (or most recent)

full backup. The merging of virtual machine state, respective to two or more virtual machine disks, is a process often performed on the backup storage system (BSS) (see e.g., FIG. 1C) so as to not burden the ongoing processes, instantiated by users, on the production computing system (PCS) and/or production storage system (PSS) (see e.g., FIG. 1B). The practice of performing synthetic full backups (312) may offer various advantages including, but not limited to, promoting: faster backup and restoration operations, better storage management, lower storage space requirements, and lower network workload.

Figure 4A:
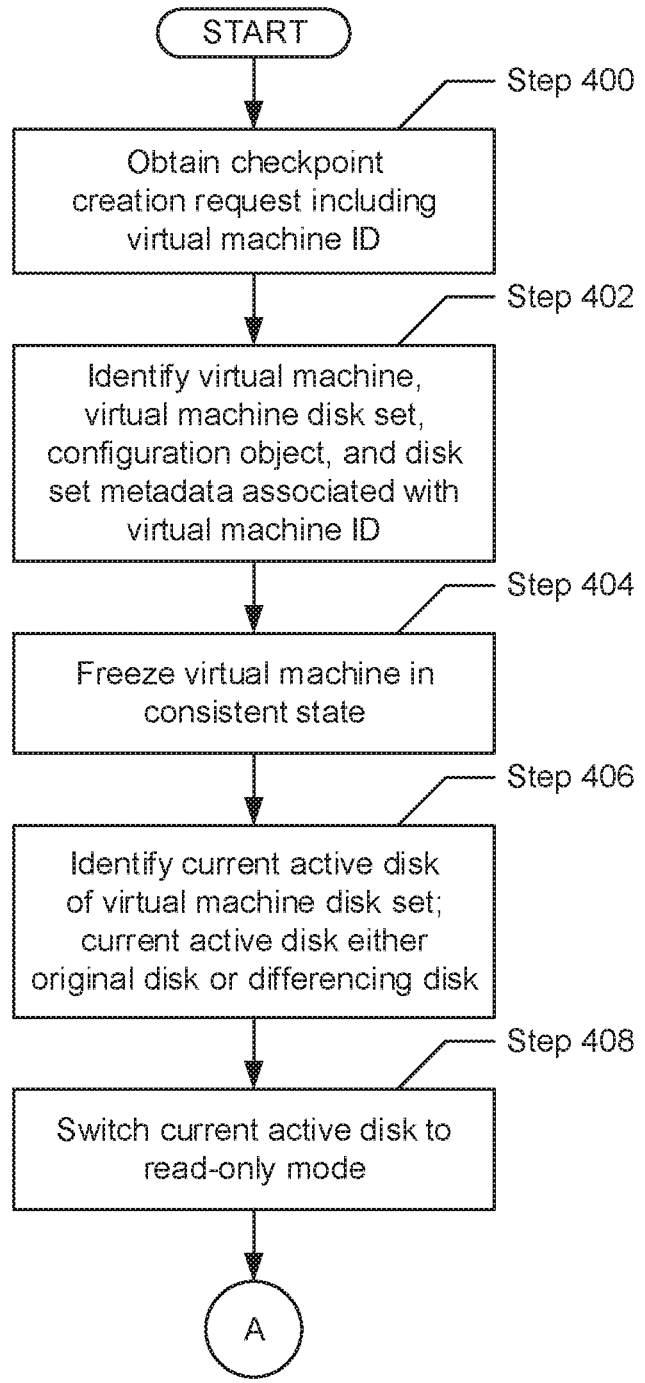
FIGS. 4A and 4B show flowcharts describing a method for creating a checkpoint in accordance with one or more embodiments of the invention.
Figure 4B:
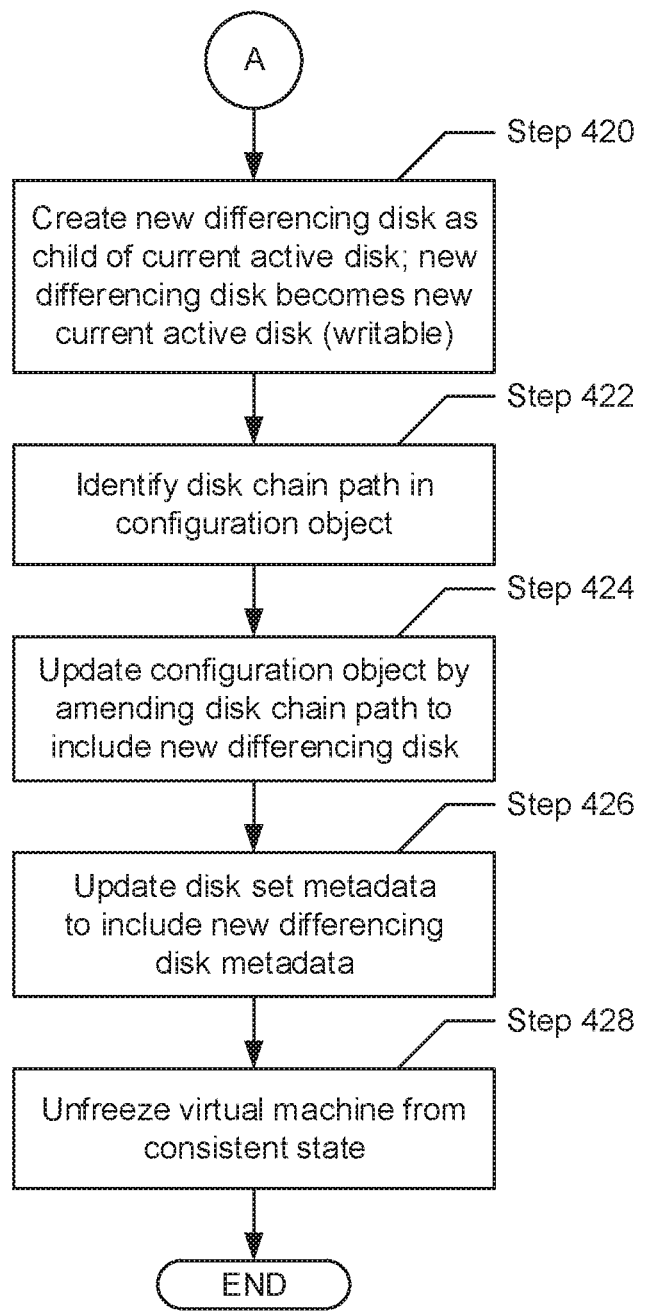

FIGS. 4A and 4B show flowcharts describing a method for creating a checkpoint in accordance with one or more embodiments of the invention. The various steps outlined below may be performed by the virtual machine backup intelligence (VMBI) executing on the production computing system (PCS) (see e.g., FIG. 1B). Further, while the various steps in the flowcharts are presented and described sequentially, one of ordinary skill will appreciate that some or all steps may be executed in different orders, may be combined or omitted, and some or all steps may be executed in parallel.

Turning to FIG. 4A, in Step 400, a checkpoint creation request is obtained. In one embodiment of the invention, the checkpoint creation request may pertain to the creation of a system checkpoint or, alternatively, to the creation of a user checkpoint (both described above). Further, the checkpoint creation request may specify a virtual machine identifier (ID) associated with the virtual machine for which the checkpoint is to be created.

In Step 402, using the virtual machine ID (obtained in Step 400), a corresponding virtual machine, a corresponding virtual machine disk set, a corresponding configuration object, and corresponding disk set metadata (see e.g., FIG. 1B) are identified. In one embodiment of the invention, the identified virtual machine may be one of the various virtual machines that may be executing on the PCS. Further, the identified virtual machine disk set, the identified configuration object, and the identified disk set metadata may represent one of the various virtual machine disk sets, configuration objects, and disk set metadata, respectively, consolidated on the production storage system (PSS).

In Step 404, the virtual machine (identified in Step 402) is frozen in a consistent state. In one embodiment of the invention, a consistent state may refer to an ideal virtual machine state for facilitating the creation of a differencing disk. In this case, a differencing disk may be created as a result of the checkpoint request (obtained in Step 400), which is detailed in one or more steps that follow. Further, arriving at the consistent state may entail: (a) deactivating the virtual machine; (b) flushing the memory cache (i.e., capturing all data in memory) associated with the virtual machine; (c) completing all in-progress IO transactions (e.g., write requests) in order, which had been submitted by the virtual machine to the virtual machine disk set (also identified in Step 402); and (d) suspending the submission of any new IO transactions to the virtual machine disk set.

In Step 406, the current active disk of the virtual machine disk set (identified in Step 402) is identified. In one embodiment of the invention, the current active disk may refer to the readable-writable (RW) virtual machine disk of the virtual machine disk set. In embodiments of the invention where multiple RW virtual machine disks exist, as may be the case in a virtual machine disk set of the parallelized configuration (see e.g., FIG. 2B), each of the multiple current active disks may be identified. Further, in one embodiment of the invention, the current active disk of the virtual machine disk set may be the original disk if, by the receipt time of the checkpoint creation request, no backup operations had been performed or no other checkpoints had been created thus far for the virtual machine. In another embodiment of the invention, the current active disk of the virtual machine disk set may be a differencing disk if, alternatively and by the receipt time of the checkpoint creation request, at least one backup operation had been performed or at least one checkpoint had been created thus far for the virtual machine. Thereinafter, in Step 408, the current active disk (identified in Step 406), is transitioned to read-only (RO) mode. In one embodiment of the invention, while in RO mode, changes in virtual machine state may no longer be captured by the current active disk.

Turning to FIG. 4B, in Step 420, a new differencing disk is created and, subsequently, incorporated into the virtual machine disk set (identified in Step 402). In one embodiment of the invention, the new differencing disk may be created as a child disk to the current active disk (identified in Step 406), whereas the current active disk may be designated as the parent disk of the new differencing disk. Further, upon its creation, the new differencing disk may be initialized as a RW virtual machine disk and, accordingly, becomes the new current active disk of the virtual machine disk set.

In Step 422, a disk chain path, specified in the configuration object (identified in Step 402), is identified. In one embodiment of the invention, the disk chain path may be represented, within the configuration object, for example, as a key-value pair listed therein. A key-value pair may refer to a set of two linked data items including: (a) a key (or a first data item) that serves as a unique identifier for the disk chain path; and (b) a value (or a second data item) that provides the disk chain path itself or a pointer to the location of the disk chain path. Accordingly, identifying the disk chain path, within the configuration object, may entail: searching the information specified in the configuration object for the key-value pair that includes the unique disk chain path identifier as the key; and, subsequently, identifying the corresponding value of the found key-value pair as the disk chain path.

In Step 424, the configuration object (identified in Step 402) is updated. Specifically, in one embodiment of the invention, the configuration object may be updated by amending the disk chain path (identified in Step 422) therein to include the new differencing disk (created in Step 420). As described above, a disk chain path may represent a linked chain of disk references, which captures the disk backup chain for properly restoring virtual machine state associated with a given virtual machine. Further, each disk reference may refer to a statement of the location (i.e., a pathname) of a given virtual machine disk, at least in part constituting the disk backup chain, with respect to a hierarchy of directories. Accordingly, amending the disk chain path to include the new differencing disk may entail: identifying the pathname for the new differencing disk, to obtain a new disk reference; and appending or concatenating the new disk reference to the existing linked chain of disk references, thereby obtaining an updated disk chain path.

In Step 426, the disk set metadata (identified in Step 402) is also updated. Specifically, in one embodiment of the invention, the disk set metadata may be updated by incorporating the disk metadata associated with the new differencing disk (created in Step 420). The disk set metadata may be a collection of individual disk metadata associated with each virtual machine disk constituting the virtual machine disk set. Further, disk metadata may store or specify various items of information that describe a corresponding virtual machine disk. Examples of these items of information are provided above (see e.g., FIG. 1B). In one embodiment of the invention, the disk metadata for the new differencing disk may include descriptive information that identifies the new differencing disk as being created as a result of a checkpoint.

In Step 428, the virtual machine (identified in Step 402) is unfrozen from the consistent state (in which the virtual machine had been placed in Step 404). In one embodiment of the invention, unfreezing the virtual machine from the consistent state may entail: (a) permitting the submission of any new IO transactions to the virtual machine disk set (identified in Step 402); and (b) reactivating the virtual machine. Further, instead of being directed to the previous current active disk (identified in Step 406), any new IO transactions may alternatively be directed to the new differencing disk (i.e., the new current active disk) (created in Step 420).

Figure 5A:
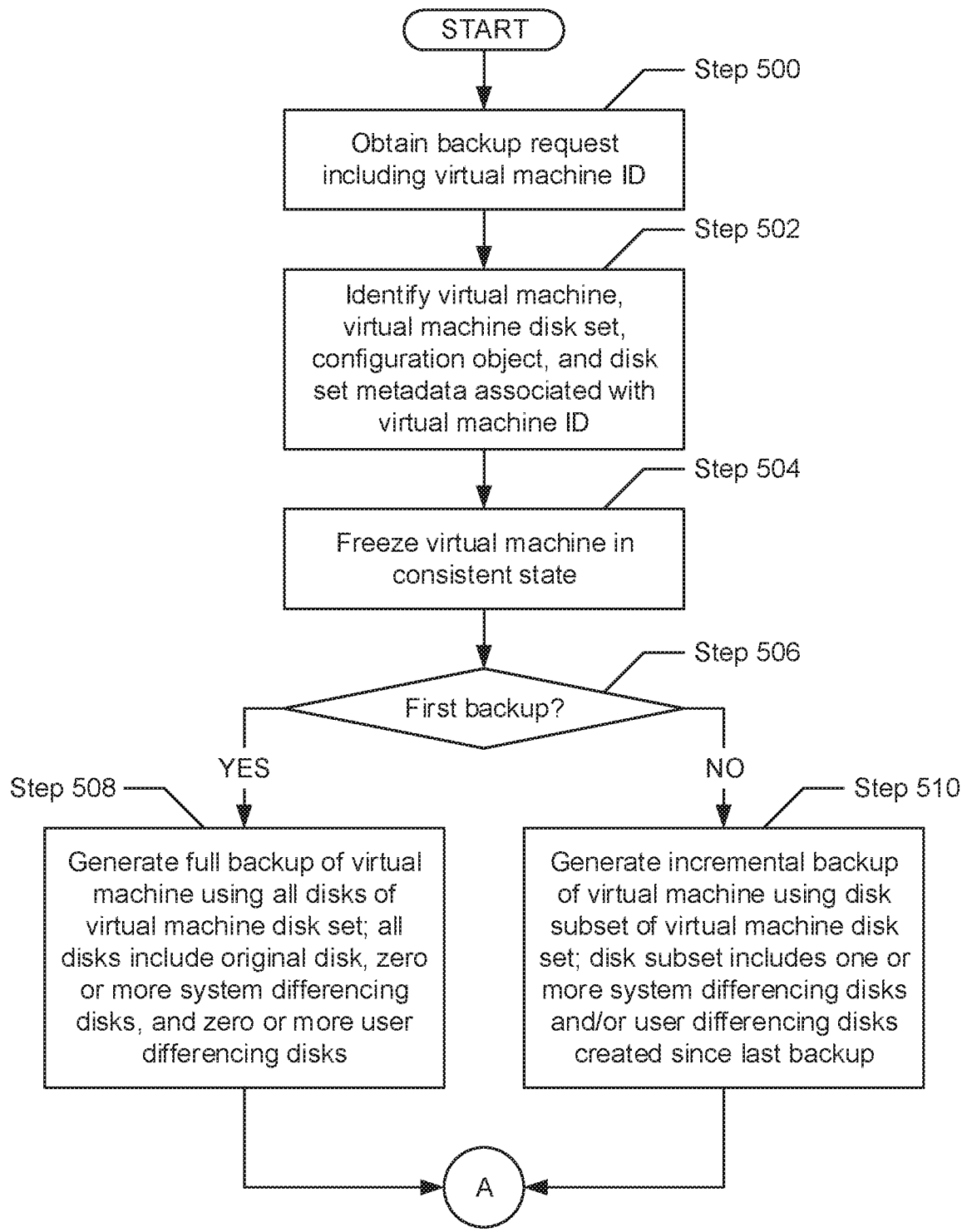
FIGS. 5A and 5B show flowcharts describing a method for creating a virtual machine backup in accordance with one or more embodiment of the invention.
Figure 5B:
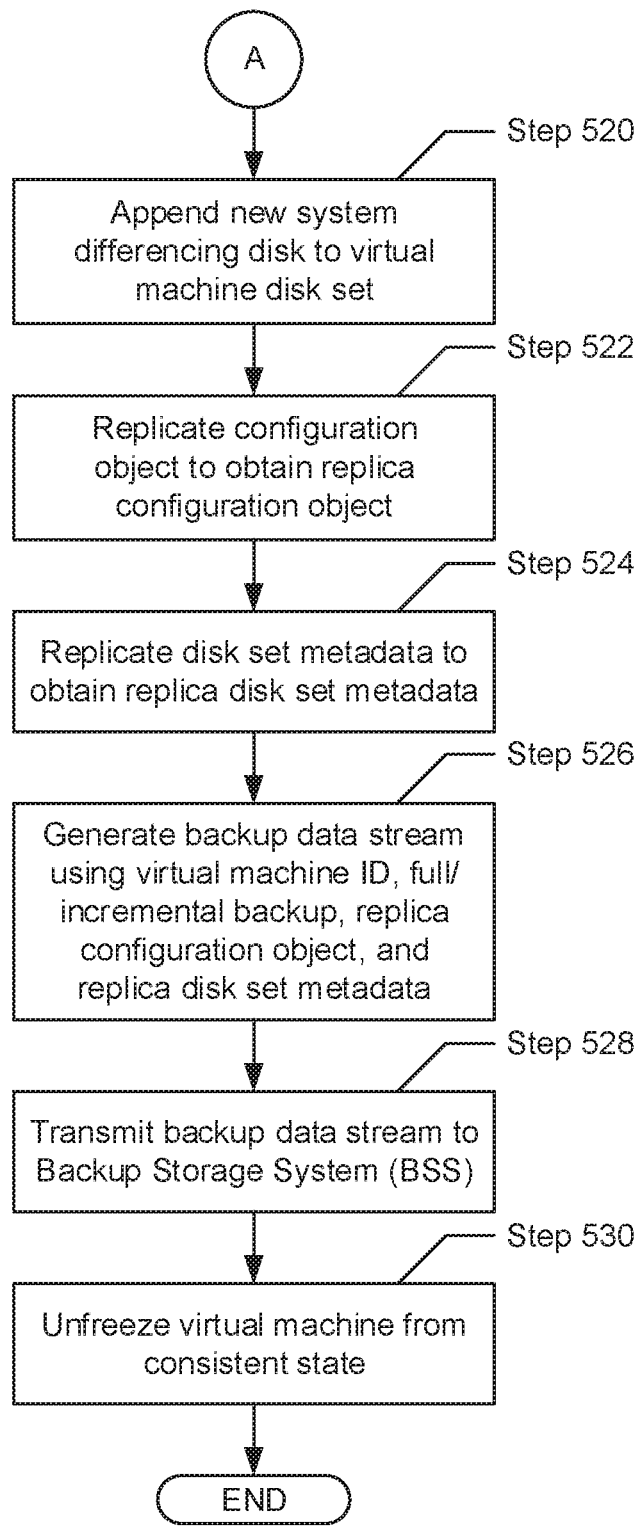

FIGS. 5A and 5B show flowcharts describing a method for creating a virtual machine backup in accordance with one or more embodiments of the invention. The various steps outlined below may be performed by the virtual machine backup intelligence (VMBI) executing on the production computing system (PCS) (see e.g., FIG. 1B). Further, while the various steps in the flowcharts are presented and described sequentially, one of ordinary skill will appreciate that some or all steps may be executed in different orders, may be combined or omitted, and some or all steps may be executed in parallel.

Turning to FIG. 5A, in Step 500, a backup request is obtained. In one embodiment of the invention, the backup request may pertain to performing a backup operation (described above). Further, the backup request may specify a virtual machine identifier (ID) associated with the virtual machine for which the backup operation is to be performed.

In Step 502, using the virtual machine ID (obtained in Step 500), a corresponding virtual machine, a corresponding virtual machine disk set, a corresponding configuration object, and corresponding disk set metadata (see e.g., FIG. 1B) are identified. In one embodiment of the invention, the identified virtual machine may be one of the various virtual machines that may be executing on the PCS. Further, the identified virtual machine disk set, the identified configuration object, and the identified disk set metadata may represent one of the various virtual machine disk sets, configuration objects, and disk set metadata, respectively, consolidated on the production storage system (PSS).

In Step 504, the virtual machine (identified in Step 502) is frozen in a consistent state. In one embodiment of the invention, a consistent state may refer to an ideal virtual machine state for facilitating the creation of a differencing disk. In this case, a differencing disk may be created as a result of the backup request (obtained in Step 500), which is detailed in one or more steps that follow. Further, arriving at the consistent state may entail: (a) deactivating the virtual machine; (b) flushing the memory cache (i.e., capturing all data in memory) associated with the virtual machine; (c) completing all in-progress IO transactions (e.g., write requests) in order, which had been submitted by the virtual machine to the virtual machine disk set (also identified in Step 502); and (d) suspending the submission of any new IO transactions to the virtual machine disk set.

In Step 506, a determination is made as to whether the backup request (obtained in Step 500) is to perform a first backup for the virtual machine (identified in Step 502). Identification of whether the backup request pertains to a first backup operation may entail inspecting the virtual machine disk set in conjunction with the disk set metadata (both identified in Step 502). Specifically, the virtual machine disk set may first be inspected to identify one or more differencing disks, if any, therein. Following the identification of at least one differencing disk, an inspection of the individual disk metadata (consolidated in the disk set metadata), associated with each differencing disk that had been identified, may be performed to determine whether a given differencing disk had been created as a result of a previous backup operation. That is, if it is determined, based on the inspecting, that zero differencing disks have been identified or, alternatively, that one or more differencing disks have been identified, which, however, had been created due to the creation of checkpoints, then the process may proceed to Step 508. On the other hand, if it is alternatively determined, based on the inspecting, that at least one differencing disk has been identified and had been created as a result of a previous backup operation, then the process may alternatively proceed to Step 510.

In Step 508, after determining (in Step 506) that the backup request (obtained in Step 500) is directed to a first backup operation, a full backup for the virtual machine (identified in Step 502) is generated. In one embodiment of the invention, generation of the full backup may entail replicating all virtual machine state representative of all existing virtual machine disks in the virtual machine disk set (also identified in Step 502). All existing virtual machine disks may include an original disk (see e.g., FIGS. 2A-2C) and zero or more differencing disks, which may have been created due to the instantiation of zero or more checkpoints, respectively. Further, each of the zero or more differencing disks may either be a system differencing disk (created as a result of a system checkpoint) or a user differencing disk (created as a result of a user checkpoint) (both described above).

In Step 510, after alternatively determining (in Step 506) that the backup request (obtained in Step 500) is directed to a second or subsequent backup operation, an incremental backup for the virtual machine (identified in Step 502) is generated. In one embodiment of the invention, generation of the incremental backup may entail replicating the changes to virtual machine state, which had incurred since the last (or previous) backup operation. Particularly, replication of these changes may include replicating virtual machine state representative of a subset of the existing virtual machine disks in the virtual machine disk set (also identified in Step 502). The aforementioned virtual machine disk subset may include one or more differencing disks, created as a result of the instantiation of one or more checkpoints, respectively, which had transpired after the completion of the last (or previous) backup operation. Further, each of the one or more differencing disks, of the virtual machine disk subset, may either be a system differencing or a user differencing disk.

Turning to FIG. 5B, in Step 520, a new system differencing disk is created and, subsequently, incorporated into the virtual machine disk set (identified in Step 502). In one embodiment of the invention, the new system differencing disk may be created as a child disk to a current active disk of the virtual machine disk set, whereas the current active disk may be designated as the parent disk of the new system differencing disk. Further, upon its creation, the new system differencing disk may be initialized as a readable-writable (RW) virtual machine disk and, accordingly, becomes the new current active disk of the virtual machine disk set.

In Step 522, the configuration object (identified in Step 502) is replicated, thereby obtaining a replica configuration object. Further, in Step 524, the disk set metadata (also identified in Step 502) is also replicated, thereby obtaining replica disk set metadata.

In Step 526, a backup data stream is generated. In one embodiment of the invention, the backup data stream may refer to a compressed sequence of digitally encoded data packets used for backup information transmission. The information carried by the backup data stream may include the virtual machine ID (obtained in Step 500), the full backup (generated in Step 508) or the incremental backup (generated in Step 510), the replica configuration object (obtained in Step 522), and the replica disk set metadata (obtained in Step 524).

In Step 528, the backup data stream (generated in Step 526) is transmitted. Specifically, in one embodiment of the invention, the backup data stream may be transmitted in the direction of the backup storage system (BSS) (see e.g., FIG. 1C). Thereafter, in Step 530, the virtual machine (identified in Step 502) is unfrozen from the consistent state (in which the virtual machine had been placed in Step 504). In one embodiment of the invention, unfreezing the virtual machine from the consistent state may entail: (a) permitting the submission of any new IO transactions to the virtual machine disk set (identified in Step 502); and (b) reactivating the virtual machine. Further, instead of being directed to the previous current active disk, any new IO transactions may alternatively be directed to the new system differencing disk (i.e., the new current active disk) (created in Step 520).

Figure 6A:
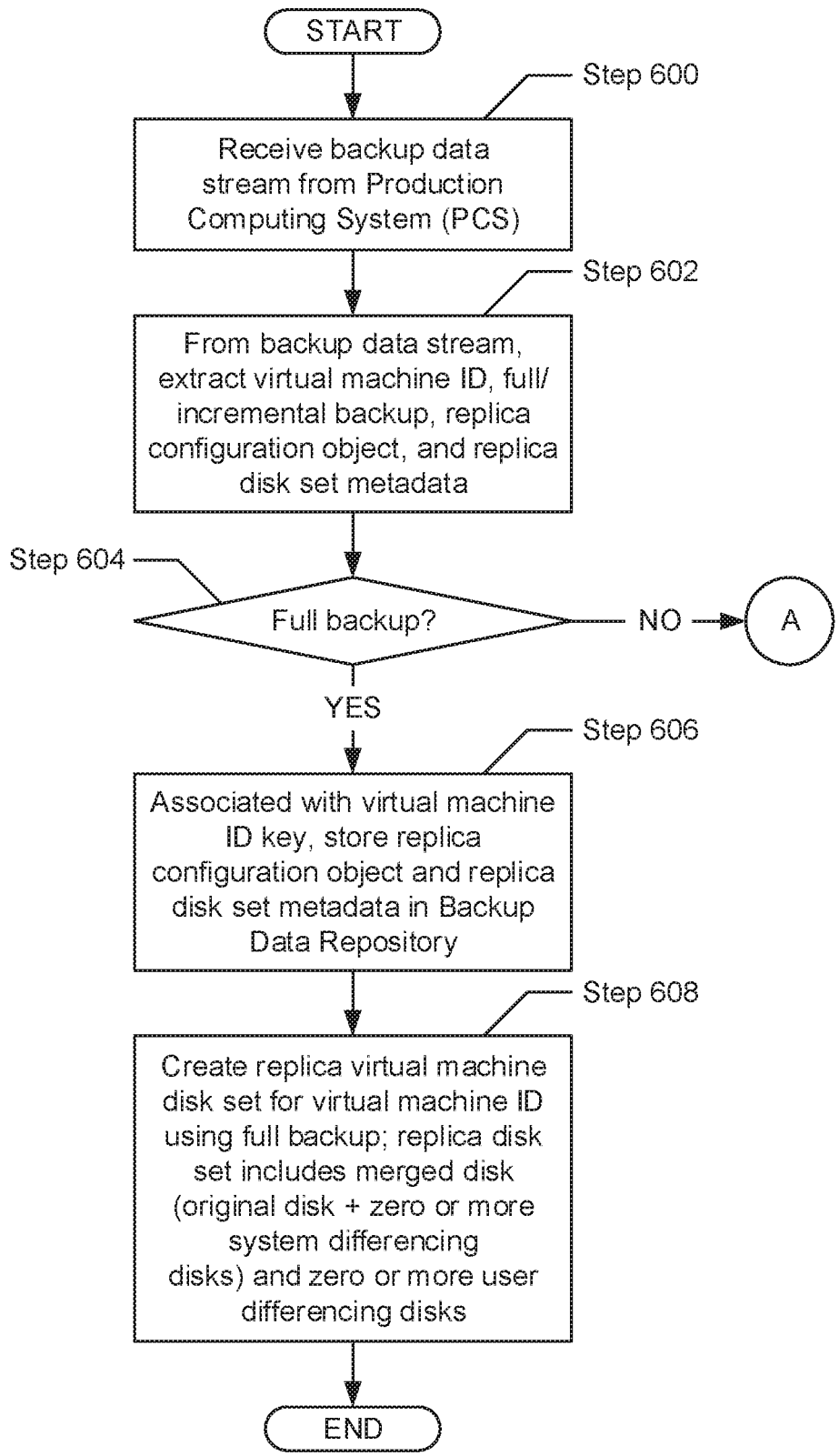
FIGS. 6A and 6B show flowcharts describing a method for consolidating a virtual machine backup in accordance with one or more embodiments of the invention.
Figure 6B:
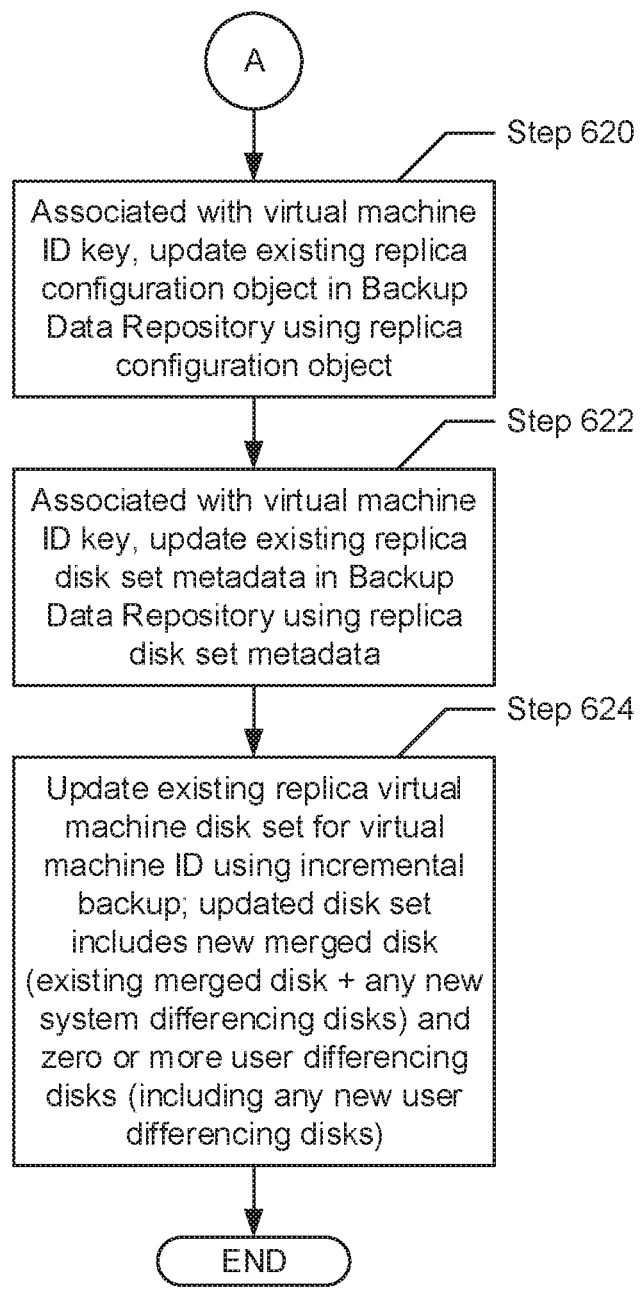

FIGS. 6A and 6B show flowcharts describing a method for consolidating a virtual machine backup in accordance with one or more embodiments of the invention. The various steps outlined below may be performed by the virtual machine backup intelligence (VMBI) executing on the backup storage system (BSS) (see e.g., FIG. 1C). Further, while the various steps in the flowcharts are presented and described sequentially, one of ordinary skill will appreciate that some or all steps may be executed in different orders, may be combined or omitted, and some or all steps may be executed in parallel.

Turning to FIG. 6A, in Step 600, a backup data stream is received. In one embodiment of the invention, the backup data stream may refer to a compressed sequence of digitally encoded data packets used for backup information transmission. Further, the backup data stream may have been received from the production computing system (PCS) (see e.g., FIG. 1A).

In Step 602, backup information carried by the backup data stream (received in Step 600) is extracted therefrom. In one embodiment of the invention, the extract backup information may include a virtual machine identifier (ID) associated with a given virtual machine that may be executing on the PCS, a backup (or copy) of virtual machine state associated with the given virtual machine, a replica configuration object for the given virtual machine, and replica disk set metadata descriptive of a virtual machine disk set (see e.g., FIG. 1B) associated with the given virtual machine.

In Step 604, a determination is made as to whether the backup of virtual machine state (extracted in Step 602) is a full backup or an incremental backup. Identification of a backup type associated with the extracted virtual machine state backup may entail inspecting header information enclosed therein. The header information may disclose various items of data synonymous to metadata descriptive of the virtual machine state backup. Examples of the various items of data may include, but are not limited to, a backup size of the virtual machine state backup, a backup format of the virtual machine state backup, optimization options (e.g., compression, deduplication, encryption, multiplexing, etc.) for consolidating the virtual machine state backup, a backup creation timestamp indicating the date and/or time associated with the creation of the virtual machine state backup, and the backup type associated with the virtual machine state backup (which may be inspected to determine whether the virtual machine state backup is a full or incremental backup). Accordingly, in one embodiment of the invention, if it is determined, based on inspecting the backup type, that the extracted virtual machine state backup is a full backup, the process may proceed to Step 606. On the other hand, in another embodiment of the invention, if it is alternatively determined, based on inspecting the backup type, that the extracted virtual machine state backup is an incremental backup, the process may alternatively proceed to Step 620 (see e.g., FIG. 6B).

In Step 606, after determining (in Step 604) that the virtual machine state backup (extracted in Step 602) is a full backup, the replica configuration object and replica disk set metadata (also extracted in Step 602) are consolidated, along with the extracted virtual machine ID, in the backup data repository residing on the BSS. Specifically, in one embodiment of the invention, the virtual machine ID, replica configuration object, and replica disk set metadata may be consolidated in the backup data repository as a new key-value pair. The new key-value pair may refer to a set of two linked data items including: (a) the virtual machine ID as the key (or the first data item); and (b) both the replica configuration object and the replica disk set metadata as the value (or the second data item).

In Step 608, a replica virtual machine disk set is created using the full virtual machine state backup (extracted in Step 602 and identified in Step 606). In one embodiment of the invention, the full virtual machine state backup may include virtual machine state representative of all existing virtual machine disks of the virtual machine disk set (consolidated on the production storage system (PSS) (see e.g., FIG. 1B)) for the virtual machine with which the virtual machine ID (also extracted in Step 602) is associated. All existing virtual machine disks may include an original disk (see e.g., FIGS. 2A-2C) and zero or more differencing disks. Further, the differencing disks, if any, may have been created due to the instantiation of checkpoints. Therefore, each of the zero or more differencing disks may either be a system differencing disk (created as a result of a system checkpoint) or a user differencing disk (created as a result of a user checkpoint) (both described above).

In one embodiment of the invention, the replica virtual machine disk set may be created using the methodology involved in synthesizing full backups. Specifically, the merging of replicated virtual machine state, representative of multiple virtual machine disks, may be performed in order to form a synthetic full backup. Within the replica virtual machine disk set, the resulting synthetic full backup may be represented through a merged virtual machine disk (i.e., a merged disk). Further, the merged disk may be created by merging the virtual machine state of the original disk and any system differencing disks representing, at least in part, the full virtual machine state backup (extracted in Step 602). The one or more user differencing disks, if any, however, may not be merged into the merged disk. This may be the case because of an existing limitation of current synthetic full backup methodologies, which only provide support for the merging of virtual machine disks created by system-initiated events (e.g., original disks created through the instantiation of virtual machines and system differencing disks created through the instantiation of system checkpoints). Moreover, rather than being merged, the one or more user differencing disks, if any, may instead be linked to the newly created merged disk. Subsequently, when completed, the replica virtual machine disk set may include the merged disk and, if any, one or more user differencing disks. Lastly, the replica virtual machine disk set may be consolidated along with the virtual machine ID (also extracted in Step 602) as a key-value pair, where the virtual machine ID may be representative of the key and the replica virtual machine disk set may be representative of the value.

Turning to FIG. 6B, in Step 620, after determining (in Step 604) that the virtual machine state backup (extracted in Step 602) is an incremental backup, existing information consolidated in the backup data repository is updated using the replica configuration object (also extracted in Step 602). In one embodiment of the invention, the existing information to be updated may be identified by performing a lookup of the backup data repository for a key-value pair that specifies the virtual machine ID (also extracted in Step 602) as the key. Upon identification of the key-value pair, the specified value therein may be collectively represented by an existing replica configuration object and an existing replica disk set metadata. Thereafter, the existing replica configuration object may be updated using the extracted replica configuration object. Specifically, one or more attributes, parameters, or variables specified in the existing replica configuration object may be amended or replaced with one or more corresponding attributes, parameters, or variables specified in the extracted replica configuration object. In one embodiment of the invention, the disk chain path (described above) specified in the existing replica configuration object may be amended or replaced with disk chain path specified in the extracted replica configuration object.

In Step 622, additional existing information consolidated in the backup data repository is updated using the replica disk set metadata (extracted in Step 602). In one embodiment of the invention, the additional existing information may pertain to the above-mentioned existing replica disk set metadata, which may have been identified along with the existing replica configuration object (updated in Step 620). Updating of the existing replica disk set metadata may entail amending the existing replica disk set metadata to include the individual disk metadata, for one or more virtual machine disks, specified in the extracted replica disk set metadata.

In Step 624, the existing replica virtual machine disk set consolidated on the BSS is updated using the incremental virtual machine state backup (extracted in Step 602 and identified in Step 606). In one embodiment of the invention, the incremental virtual machine state backup may include virtual machine state representative of a subset of the existing virtual machine disks of the virtual machine disk set (consolidated on the PSS (see e.g., FIG. 1B)) for the virtual machine with which the virtual machine ID (extracted in Step 602) is associated. The virtual machine disk subset may include one or more differencing disks, created as a result of the instantiation of one or more checkpoints, respectively, which had transpired after the completion of the last (or previous) backup operation. Further, each of the one or more differencing disks, of the virtual machine disk subset, may either be a system differencing disk (created as a result of a system checkpoint) or a user differencing disk (created as a result of a user checkpoint) (both described above).

In one embodiment of the invention, the replica virtual machine disk set may be updated in view of full backup synthesis. Specifically, the merging of replicated virtual machine state, representative of multiple virtual machine disks, may be performed in order to form a new synthetic full backup (i.e., a new merged disk). That is, an existing merged disk of the existing replica virtual machine disk set may be updated, to form the new merged disk, by merging the virtual machine state representative of the existing merged disk with the virtual machine state representative of any system differencing disks that, at least in part, constitute the incremental virtual machine state backup (extracted in Step 602). However, one or more user differencing disks, if any at least partially represent the incremental virtual machine state backup, may not be merged into the existing merged disk to form the new merged disk. This may be the case because of an existing limitation of current synthetic full backup methodologies, which only provide support for the merging of virtual machine disks created by system-initiated events (e.g., original disks created through the instantiation of virtual machines and system differencing disks created through the instantiation of system checkpoints). Moreover, rather than being merged, the one or more user differencing disks, if any, may instead be linked to the new merged disk. Subsequently, when completed, the updated replica virtual machine disk set may include the new merged disk, any existing user differencing disks that had already been included in the existing replica virtual machine disk set, and if any, one or more new user differencing disks that at least partially constitutes the incremental virtual machine state backup.

Figure 7A:
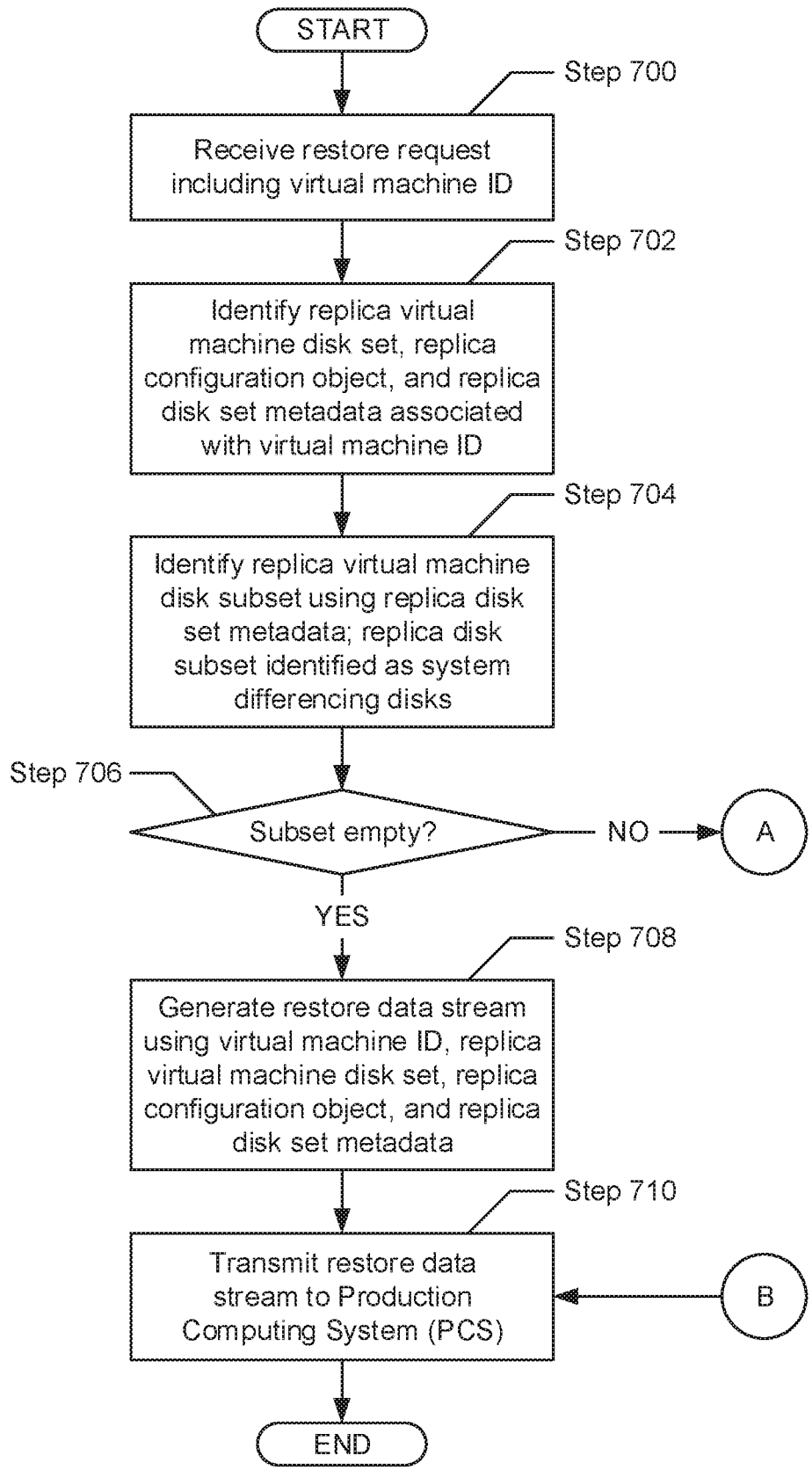
FIGS. 7A and 7B show flowcharts describing a method for restoring a virtual machine in accordance with one or more embodiments of the invention.
Figure 7B:
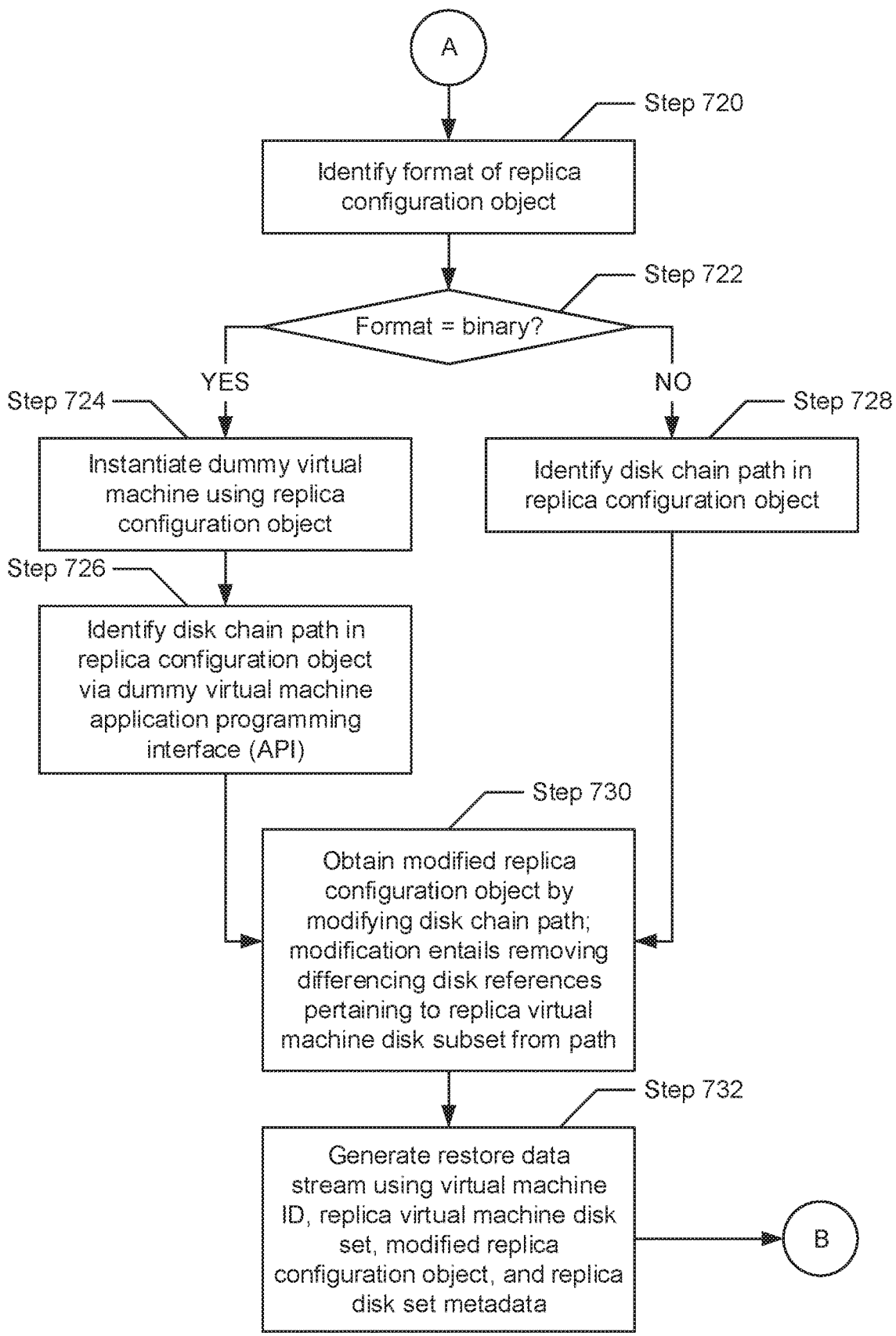

FIGS. 7A and 7B show flowcharts describing a method for restoring a virtual machine in accordance with one or more embodiments of the invention. The various steps outlined below may be performed by the virtual machine backup intelligence (VMBI) executing on the backup storage system (BSS) (see e.g., FIG. 1C). Further, while the various steps in the flowcharts are presented and described sequentially, one of ordinary skill will appreciate that some or all steps may be executed in different orders, may be combined or omitted, and some or all steps may be executed in parallel.

Turning to FIG. 7A, in Step 700, a restore request is received. In one embodiment of the invention, the restore request may pertain to performing a restoration operation (i.e., restoration of a virtual machine). Further, the restore request may specify a virtual machine identifier (ID) associated with the virtual machine for which the restoration operation is to be performed.

In Step 702, using the virtual machine ID (obtained in Step 700), a corresponding replica virtual machine disk set, a corresponding replica configuration object, and corresponding replica disk set metadata (see e.g., FIG. 1B) are identified. In one embodiment of the invention, the identified replica virtual machine disk set may represent one of the various replica virtual machine disk sets consolidated on the BSS. Further, the identified replica configuration object and the identified replica disk set metadata may represent one of the various replica configuration objects and replica disk set metadata, respectively, consolidated in the backup data repository (see e.g., FIG. 1C).

In Step 704, a subset of the replica virtual machine disks (i.e., a replica virtual machine disk subset) of the replica virtual machine disk set (identified in Step 702) is identified. In one embodiment of the invention, the replica virtual machine disk subset may be identified using at least a portion of the replica disk set metadata (also identified in Step 702). Specifically, the replica disk set metadata may at least store or specify descriptive information that indicates whether each given replica virtual machine disk, of the identified replica virtual machine disk set, had been created as a result of a backup operation or a checkpoint, and if the latter, whether the checkpoint pertains to a system checkpoint or a user checkpoint. Accordingly, using this aforementioned descriptive information, system differencing disks, if any constitute the replica virtual machine disk set, may be identified into the replica virtual machine disk subset.

In Step 706, a determination is made as to whether the replica virtual machine disk subset (identified in Step 704) includes at least one system differencing disk. In one embodiment of the invention, if it is determined that the replica virtual machine disk subset does not specify any system differencing disks (i.e., is empty), then the process may proceed to Step 708. On the other hand, in another embodiment of the invention, if it is alternatively determined that the replica virtual machine disk subset specifies at least one system differencing disk, then the process may proceed to Step 720 (see e.g., FIG. 7B).

In Step 708, after determining (in Step 706) that the replica virtual machine disk subset (identified in Step 704) does not specify any system differencing disks, a restore data stream is generated. In one embodiment of the invention, the restore data stream may refer to a compressed sequence of digitally encoded data packets used for restoration information transmission. The information carried by the restore data stream may include the virtual machine ID (obtained in Step 700), as well as the replica virtual machine disk set, the replica configuration object, and the replica disk set metadata (identified in Step 702).

In Step 710, the restore data stream (generated in Step 708) is transmitted. Specifically, in one embodiment of the invention, the restore data stream may be transmitted in the direction of the production computing system (PCS) (see e.g., FIG. 1B). Further, the virtual machine backup intelligence (VMBI), executing thereon, may receive the restore data stream and, subsequently, use the enclosed information to restore the respective virtual machine.

Turning to FIG. 7B, in Step 720, after alternatively determining (in Step 706) that the replica virtual machine disk subset (identified in Step 704) specifies at least one system differencing disk, a format of the replica configuration object (identified in Step 702) is identified. In one embodiment of the invention, the replica configuration object may be expressed in a binary format (i.e., where information therein is stored in the form of ones and zeros) or a non-binary format such as, for example, through the use of extensible markup language (XML). Further, identification of the replica configuration object format may entail inspection of the file extension associated with the replica configuration object, which may denote, for example, a BIN extension for the binary format or a XML extension for the non-binary format.

In Step 722, a determination is made as to whether the replica configuration object format (identified in Step 720) is binary. Subsequently, if it is determined that the replica configuration object format is binary, then the process may proceed to Step 724. On the other hand, in another embodiment of the invention, if it is alternatively determined that the replica configuration object format is non-binary, then the process may alternatively proceed to Step 728.

In Step 724, after determining (in Step 722) that the replica configuration object format is binary, a dummy virtual machine is instantiated on the BSS. In one embodiment of the invention, a dummy virtual machine may refer to an inactive virtual machine, which may not interface with a virtual machine disk set, and thus, may not submit input-output (IO) operations thereto. Further, the dummy virtual machine may be instantiated for the purpose of converting the binary replica configuration object into another format (i.e., a non-binary format such as, for example, XML) that facilitates identification and manipulation of the information specified in the replica configuration object. Accordingly, the dummy virtual machine may be instantiated using the binary replica configuration object, to obtain a non-binary replica configuration object.

In Step 726, through the dummy virtual machine (instantiated in Step 724), a disk chain path specified in the non-binary replica configuration object (also obtained in Step 724) is identified. In one embodiment of the invention, the disk chain path may be represented, within the replica configuration object, for example, as a key-value pair listed therein. A key-value pair may refer to a set of two linked data items including: (a) a key (or a first data item) that serves as a unique identifier for the disk chain path; and (b) a value (or a second data item) that provides the disk chain path itself or a pointer to the location of the disk chain path. Accordingly, identifying the disk chain path, within the replica configuration object, may entail: searching the information specified in the configuration object for the key-value pair that includes the unique disk chain path identifier as the key; and, subsequently, identifying the corresponding value of the found key-value pair as the disk chain path. Moreover, the disk chain path may be identified via an application programming interface (API) of the dummy virtual machine.

In Step 728, after alternatively determining (in Step 722) that the replica configuration object format is non-binary, a disk chain path specified in the non-binary replica configuration object is identified. In one embodiment of the invention, the disk chain path may be represented, within the replica configuration object, for example, as a key-value pair listed therein. A key-value pair may refer to a set of two linked data items including: (a) a key (or a first data item) that serves as a unique identifier for the disk chain path; and (b) a value (or a second data item) that provides the disk chain path itself or a pointer to the location of the disk chain path. Accordingly, identifying the disk chain path, within the replica configuration object, may entail: searching the information specified in the configuration object for the key-value pair that includes the unique disk chain path identifier as the key; and, subsequently, identifying the corresponding value of the found key-value pair as the disk chain path.

In Step 730, following identification of the disk chain path in the replica configuration object (in either Step 726 or Step 728), a modified replica configuration object is obtained by modifying the identified disk chain path specified therein. In one embodiment of the invention, a disk chain path may represent a linked chain of disk references, which captures the disk backup chain for properly restoring virtual machine state associated with a given virtual machine. Further, each disk reference may refer to a statement of the location (i.e., a pathname) of a given virtual machine disk, at least in part constituting the disk backup chain, with respect to a hierarchy of directories.

In one embodiment of the invention, the identified disk chain path may be modified by removing any disk references therefrom, which are directed to system differencing disks. Further, the modification may entail using at least a portion of the replica disk set metadata (identified in Step 702). Specifically, the replica disk set metadata may at least store or specify descriptive information that indicates whether each given virtual machine disk, of a virtual machine disk set (corresponding to the replica virtual machine disk set also identified in Step 702), had been created as a result of a backup operation or a checkpoint, and if the latter, whether the checkpoint pertains to a system checkpoint or a user checkpoint. Accordingly, using this aforementioned descriptive information, system differencing disks, if any constitute a corresponding virtual machine disk set, may be identified. These identified system differencing disks may subsequently be mapped to their respective disk reference integrated into the identified disk chain path. Subsequently, after their identification, these respective disk reference(s) may be removed from identified disk chain path, thereby, obtaining the modified replica configuration object that specifies a modified disk chain path.

In one embodiment of the invention, the disk reference(s) directed to system differencing disk(s) may be removed from the identified disk chain path in order to thwart a potential error which may transpire during restoration of a respective virtual machine on the PCS. Specifically, unmodified, the replica configuration object (consolidated on the BSS) is representative of an exact copy of a corresponding configuration object (consolidated on the production storage system (PSS) (see e.g., FIG. 1B)). Accordingly, the corresponding configuration object specifies the same unmodified disk chain path that is specified in the unmodified replica configuration object. Further, the unmodified disk chain path, as mentioned above, may represent a linked chain of disk references, where each disk reference may be directed to a respective virtual machine disk of a virtual machine disk set (also consolidated on the PSS). The virtual machine disk set may include an original disk and zero or more differencing disks, where each differencing disk, if any are included, may either be a system differencing disk or a user differencing disk. Subsequently, there exists a one-to-one mapping of virtual machine disks (of the virtual machine disk set) to disk references (in the unmodified disk chain path).

Conversely, in one embodiment of the invention, a one-to-one mapping between virtual machine disks (of the replica virtual machine disk set) and disk references (in the unmodified disk chain path) may not exist. That is, as described above, when virtual machine state is consolidated on the BSS, protocols associated with full backup synthesis may be followed. Full backup synthesis may entail the merging of replicated virtual machine state, representative of multiple virtual machine disks, to form a synthetic full backup (i.e., a merged disk). The resulting merged disk thus incorporates virtual machine state associated with the original disk (of the virtual machine disk set) along with all virtual machine state associated with any system differencing disks (also of the virtual machine disk set). Further, any virtual machine state associated with one or more user differencing disks, if any (of the virtual machine disk set), may be left unmerged.

Accordingly, in one embodiment of the invention, the replica virtual machine disk set may include a merged disk and zero or more user differencing disks. With respect to the unmodified disk chain path (specified in the unmodified replica configuration object), the merged disk may be mapped to the disk reference that pertains to the original disk since, in fact, the merged disk is just the original disk that further incorporates the virtual machine state of any system differencing disks. Moreover, the user differencing disks (of the replica virtual machine disk set), if any, may be mapped to a respective disk reference that may already exist in the unmodified disk chain path because the corresponding virtual machine disk set would have included the same user differencing disks. What remains in the unmodified disk chain path (in the unmodified replica configuration object), which does not map to any virtual machine disk in the replica virtual machine disk set, may be the one or more disk references that pertain to the one or more system differencing disks, respectively, of the virtual machine disk set (consolidated on the PSS).

In one embodiment of the invention, should restoration of a respective virtual machine (on the PCS) be attempted using the unmodified replica configuration object in conjunction with the replica virtual machine disk set, an error may ensue. Specifically, the restoration operation may be unable to proceed because the disk reference(s), directed to the one or more system differencing disks (specified in the unmodified disk chain path of the unmodified replica configuration object), could not be mapped to any virtual machine disk in the replica virtual machine disk set. Accordingly, to circumvent the potential of such an error to occur, embodiments of the invention modify the disk chain path to exclude any disk reference(s) that may be directed to any system differencing disk(s). Further, as described above, the disk chain path may be significant to the restoration operation because the disk chain path captures the disk backup chain for properly restoring virtual machine state associated with a given virtual machine.

In Step 732, a restore data stream is generated. In one embodiment of the invention, the restore data stream may refer to a compressed sequence of digitally encoded data packets used for restoration information transmission. The information carried by the restore data stream may include the virtual machine ID (obtained in Step 700), the modified replica configuration object (obtained in Step 730), as well as the replica virtual machine disk set and the replica disk set metadata (identified in Step 702). Hereinafter, the process may proceed to Step 710, where the generated restore data stream is transmitted. Specifically, in one embodiment of the invention, the restore data stream may be transmitted in the direction of the (PCS) (see e.g., FIG. 1B). Further, the VMBI, executing thereon, may receive the restore data stream and, subsequently, use the enclosed information to restore the respective virtual machine.

Figure 8:
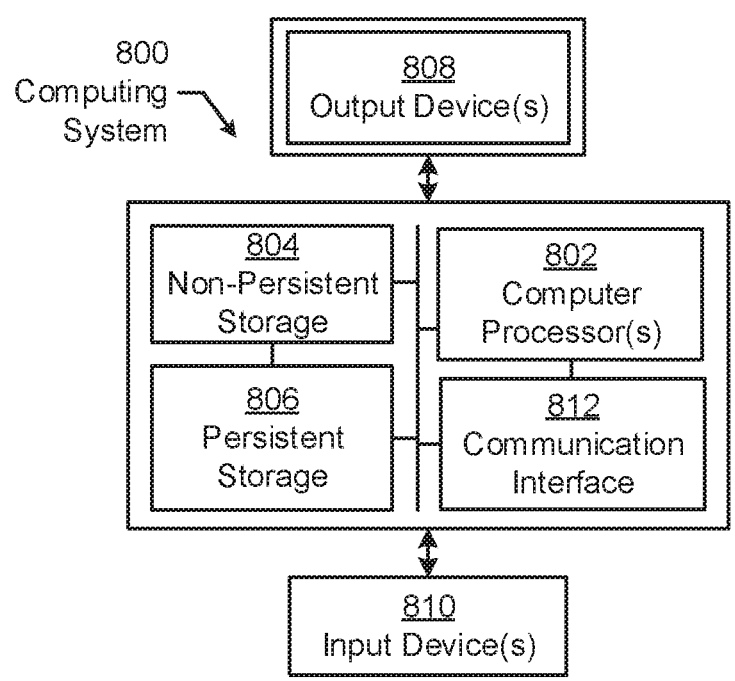
FIG. 8 shows a computing system in accordance with one or more embodiments of the invention.

FIG. 8 shows a computing system in accordance with one or more embodiments of the invention. The computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one embodiment of the invention, the computer processor(s) (802) may be an integrated circuit for processing instructions. For example, the computer processor(s) may be one or more cores or micro-cores of a processor. The computing system (800) may also include one or more input devices (810), such as a touchscreen, keyboard, mouse, microphone, touchpad, electronic pen, or any other type of input device. Further, the communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

In one embodiment of the invention, the computing system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 9A:
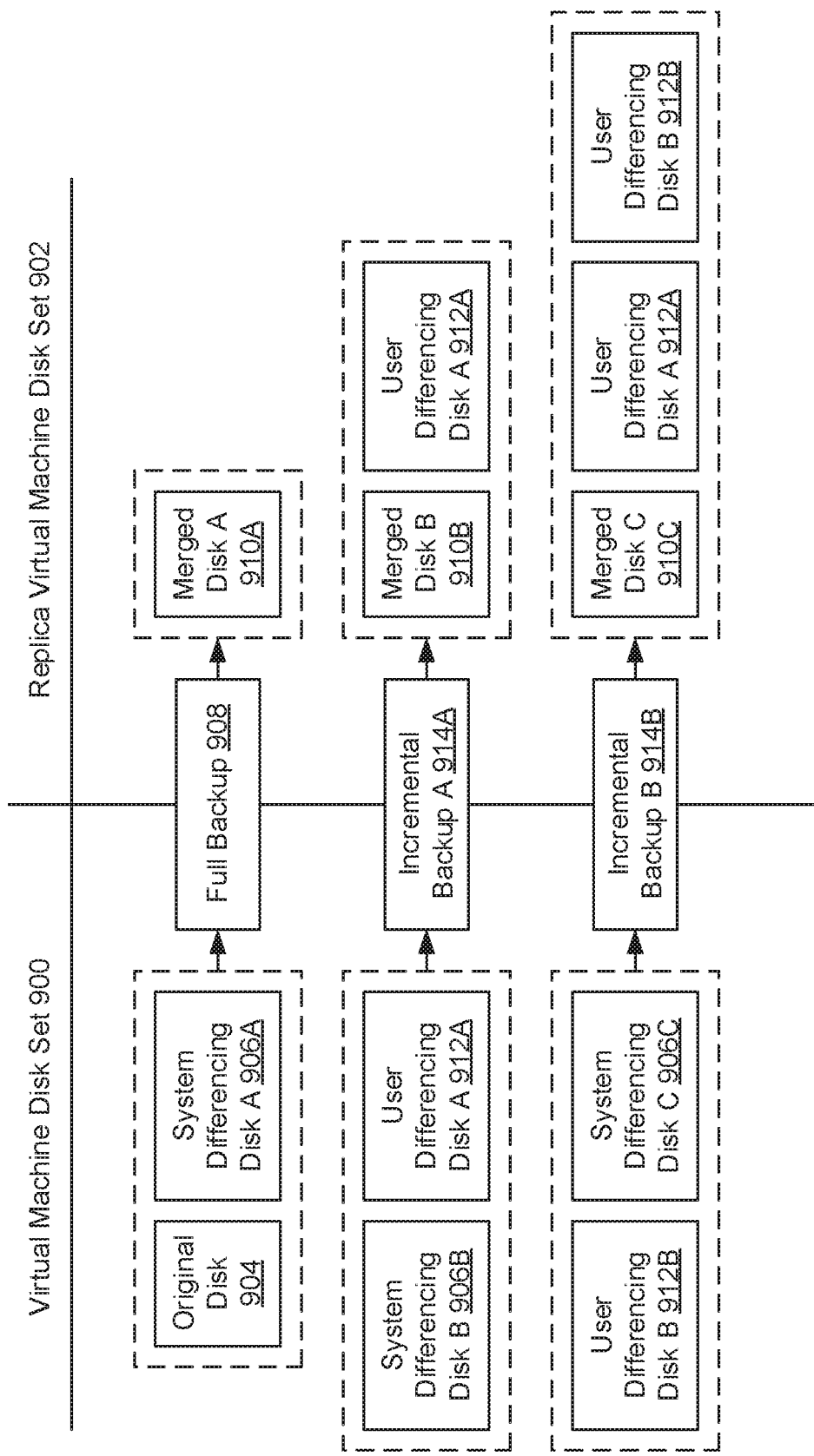
FIGS. 9A-9C show an example scenario in accordance with one or more embodiments of the invention.
Figure 9B:
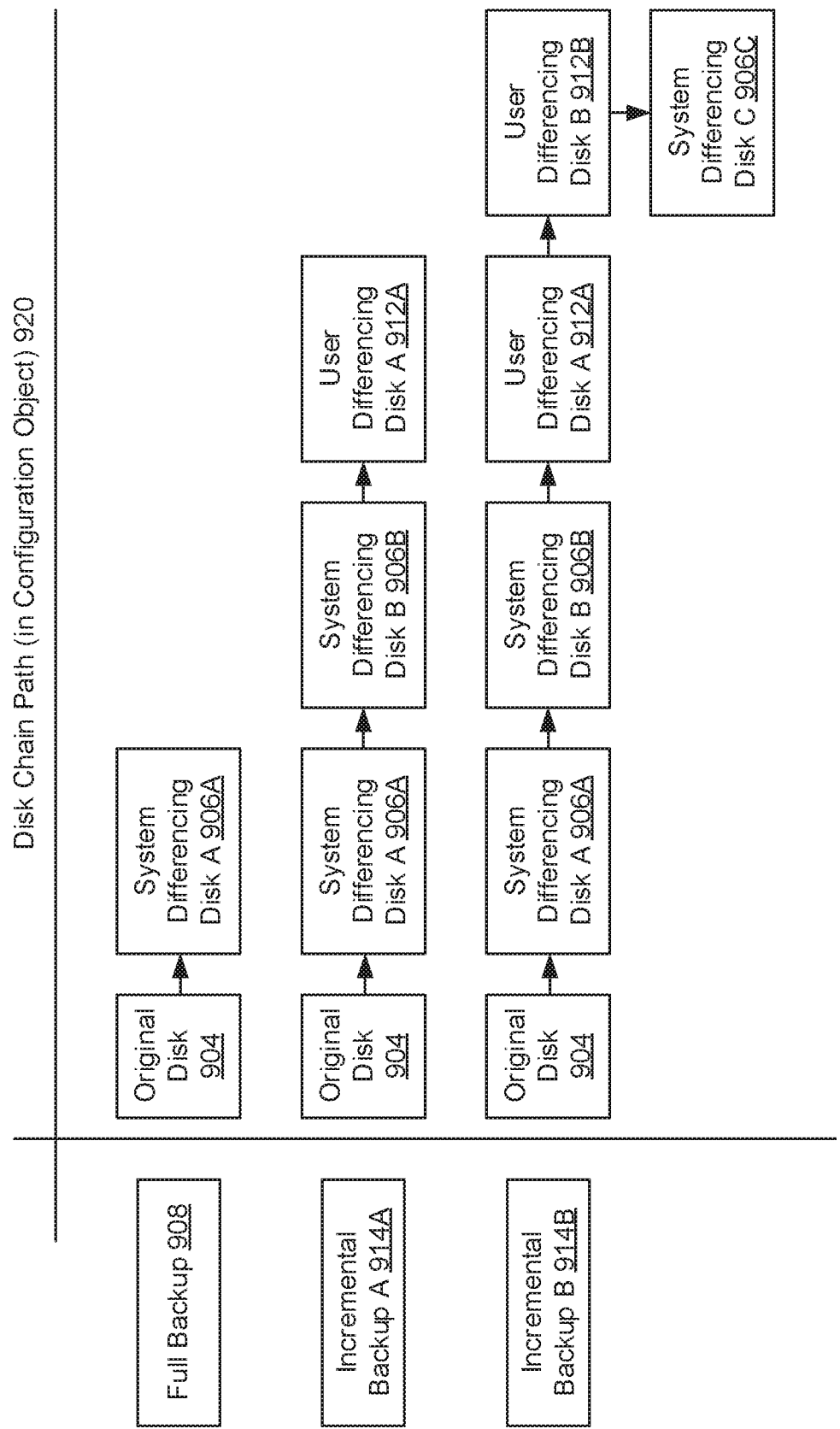
Figure 9C:
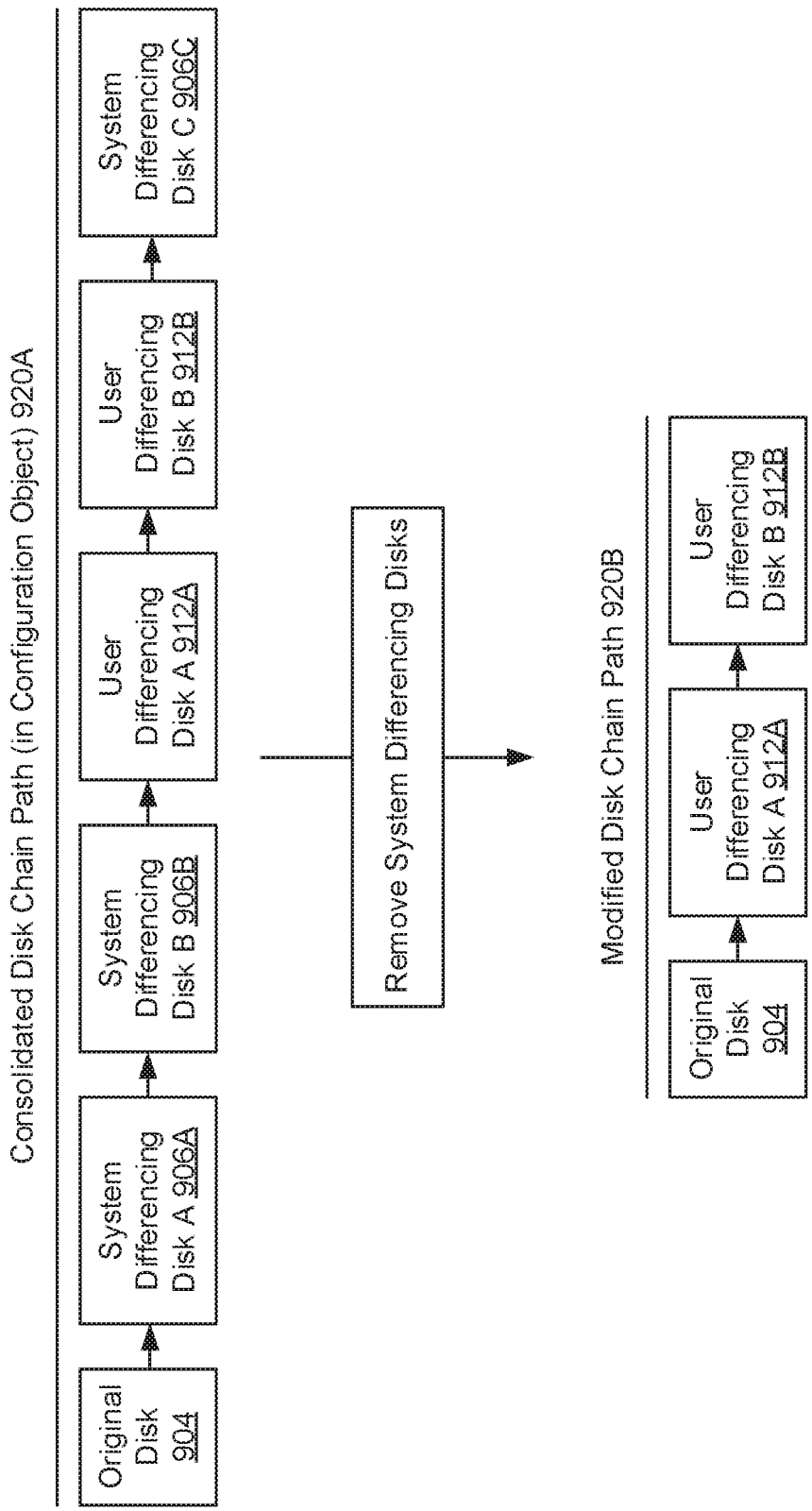

FIGS. 9A-9C show an example scenario in accordance with one or more embodiments of the invention. The following example, presented in conjunction with components shown in FIGS. 9A-9C, is for explanatory purposes only and not intended to limit the scope of the invention.

Turning to the example scenario, consider an example system (not shown) similar to the system portrayed in FIG. 1A and further detailed in FIGS. 1B and 1C. A virtual machine disk set (900) (see e.g., FIG. 9A), consolidated on the production storage system (PSS) and associated with a given virtual machine (not shown) executing on the production computing system (PCS), may specify multiple virtual machine disks arranged in a sequential configuration (see e.g., FIG. 2C). The multiple virtual machine disks include, per the following creation order: an original disk (904), a first system differencing disk (906A), a second system differencing disk (906B), a first user differencing disk (912A), a second user differencing disk (912B), and a third system differencing disk (906C).

Further, throughout a period of time, consider that multiple backups are performed to preserve the virtual machine state respective to each of these multiple virtual machine disks. Specifically, a full backup (908) is performed first, which includes virtual machine state representative of the original disk (904) and the first system differencing disk (906A). Next, a first incremental backup (914A) is performed, which includes virtual machine state representative of the second system differencing disk (906B) and the first user differencing disk (912A). Subsequently, a second incremental backup (914B) is performed, which includes virtual machine state representative of the second user differencing disk (912B) and the third system differencing disk (906C).

On the backup storage system (BSS) side, the replica virtual machine disk set (902) consolidated thereon may be created and updated in the following manner as the various backups are received: (a) upon receipt of the full backup (908), the replica virtual machine disk set (902) is created and includes a first merged disk (910A), where the first merged disk (910A) incorporates virtual machine state representative of the original disk (904) and the first system differencing disk (906A) which have been merged together due to full backup synthesis; (b) upon receipt of the first incremental backup (914A), the replica virtual machine disk set (902) is updated to include a second merged disk (910B) and the first user differencing disk (912A), where the second merged disk (910B) incorporates virtual machine state representative of the first merged disk (910A) and the second system differencing disk (906B) which have been merged together due to full backup synthesis; and (c) upon receipt of the second incremental backup (914B), the replica virtual machine disk set (902) is further updated to include a third merged disk (910C), the first user differencing disk (912A), and the second user differencing disk (912B), where the third merged disk (910C) incorporates virtual machine state representative of the second merged disk (910B) and the third system differencing disk (906C) which have been merged together due to full backup synthesis.

Turning to FIG. 9B, the amending of the disk chain path (920), in the replica configuration object (not shown) (consolidated on the BSS), as the various backups are received is portrayed. Specifically, upon receipt of the full backup (908), the disk chain path (920) may be initialized with linked disk references directed to the original disk (904) and the first system differencing disk (906A). Further, upon receipt of the first incremental backup (914A), the disk chain path (920) is updated to further link disk references directed to the second system differencing disk (906B) and the first user differencing disk (912A). Moreover, upon receipt of the second incremental backup (914B), the disk chain path (920) is updated to further link disk references directed to the second user differencing disk (912B) and the third system differencing disk (906C).

Next, consider that a failure event transpires on the PCS and/or PSS, which leads to the submission of a restore request (to the BSS), in order to retrieve the replica information necessary for the given virtual machine to recover. In response to the restore request, the essential replica information is identified, which at least include: the replica virtual machine disk set (902) (see e.g., FIG. 9A), a replica configuration object that specifies the disk chain path (920A) (see e.g., FIG. 9C), and replica disk set metadata (not shown). Subsequently, because the disk chain path (920A) specifies disk references to the first system differencing disk (906A), the second system differencing disk (906B), and the third system differencing disk (906C), which are not included in the replica virtual machine disk set (902), the disk chain path (902A) is modified. Modification of the disk chain path (920A) entails removing the disk references directed to the first, second, and third system differencing disks (906A-906C). That which results, post-modification, is a modified replica configuration object (not shown) that specifies a modified disk chain path (920B). The modified disk chain path (920) includes: (a) a first disk reference directed to the original disk (904) (i.e., the third merged disk (910C) in the final replica virtual machine disk set (902); (b) a second disk reference directed to the first user differencing disk (912A); and (c) a third disk reference directed to the second user differencing disk (912B). The modified replica configuration object (not shown), along with the replica virtual machine disk set (902) and the replica disk set metadata (not shown), are subsequently delivered to the PCS, where this necessary replica information is used towards restoring the given virtual machine.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for restoring virtual machines, comprising:
receiving a first restore request comprising a first virtual machine identifier (ID) associated with a first virtual machine;
identifying a first replica virtual machine disk set, a first replica configuration object, and first replica disk set metadata associated with the first virtual machine ID;
identifying, using the first replica disk set metadata, a first replica virtual machine disk subset of the first replica virtual machine disk set;
making a first determination that the first replica virtual machine disk subset is non-empty;
identifying, based on the first determination, a first format of the first replica configuration object;
making a second determination that the first format is non-binary;
identifying, based on the second determination, a first disk chain path specified in the first replica configuration object;
modifying the first disk chain path to obtain a first modified replica configuration object;
generating a first restore data stream comprising the first virtual machine ID, the first replica virtual machine disk set, the first modified replica configuration object, and the first replica disk set metadata; and
providing, to a production computing system (PCS), the first restore data stream to restore the first virtual machine.

2. The method of claim 1, wherein the first replica virtual machine disk subset comprises at least one system differencing disk.

3. The method of claim 1, wherein the first disk chain path comprises a linked chain of disk references, wherein each disk reference pertains to a different virtual machine disk of a first virtual machine disk set, wherein the first replica virtual machine disk set comprises at least a subset of virtual machine disks specified in the first virtual machine disk set.

4. The method of claim 1, wherein modifying the first disk chain path, comprises:
identifying, using the first replica disk set metadata, at least one disk reference associated with at least one system differencing disk specified in the first disk chain path; and
removing the at least one disk reference from the first disk chain path to obtain a first modified disk chain path,
wherein the first modified disk chain path comprises a linked chain of disk references comprising a first disk reference associated with an original disk.

5. The method of claim 4, wherein the linked chain of disk references further comprises at least one other disk reference associated with at least one user differencing disk.

6. The method of claim 1, wherein the first format is extensible markup language (XML).

7. The method of claim 1, further comprising:
receiving a second restore request comprising a second virtual machine ID associated with a second virtual machine;
identifying a second replica virtual machine disk set, a second replica configuration object, and second replica disk metadata associated with the second virtual machine ID;
identifying, using the second replica disk metadata, a second replica disk subset of the second replica disk set;
making a third determination that the second replica disk subset is non-empty;
identifying, based on the third determination, a second format of the second replica configuration object;
making a fourth determination that the second format is binary;
based on the fourth determination:
instantiating a dummy virtual machine using the second replica configuration object;
identifying, through the dummy virtual machine, a second disk chain path specified in the second replica configuration object;
modifying the second disk chain path to obtain a second modified replica configuration object;
generating a second restore data stream comprising the second virtual machine ID, the second replica virtual machine disk set, the second modified replica configuration object, and the second replica disk set metadata; and
providing, to the PCS, the second restore data stream to restore the second virtual machine.

8. The method of claim 1, further comprising:
receiving a second restore request comprising a second virtual machine ID associated with a second virtual machine;
identifying, associated with the second virtual machine ID, a second replica virtual machine disk set, a second replica configuration object, and second replica disk metadata;
identifying, using the second replica disk metadata, a second replica disk subset of the second replica disk set;
making a third determination that the second replica disk subset is empty;
generating, based on the third determination, a second restore data stream comprising the second virtual machine ID, the second replica virtual machine disk set, the second replica configuration object, and the second replica disk set metadata; and
providing, to the PCS, the second restore data stream to restore the second virtual machine.

9. A system, comprising:
a plurality of replica virtual machine disk sets;
a backup data repository comprising memory that stores a plurality of replica configuration objects and a plurality of replica disk set metadata; and
a first virtual machine backup intelligence (VMBI) executing on a first computer processor operatively connected to the plurality of replica virtual machine disk sets and the backup data repository,
wherein the first VMBI is programmed to:
receive a first restore request comprising a first virtual machine identifier (ID) associated with a first virtual machine;
identify, associated with the first virtual machine ID, a first replica virtual machine disk set of the plurality of replica virtual machine disk sets, a first replica configuration object of the plurality of replica configuration objects, and first replica disk set metadata of the plurality of replica disk set metadata;
identify, using the first replica disk set metadata, a first replica virtual machine disk subset of the first replica virtual machine disk set;
make a first determination that the first replica virtual machine disk subset is non-empty;
identify, based on the first determination, a first format of the first replica configuration object;
make a second determination that the first format is non-binary;

identify, based on the second determination, a first disk chain path specified in the first replica configuration object;
modify the first disk chain path to obtain a first modified replica configuration object;
generate a first restore data stream comprising the first virtual machine ID, the first replica virtual machine disk set, the first modified replica configuration object, and the first replica disk set metadata; and
provide, to a production computing system (PCS), the first restore data stream to restore the first virtual machine.

10. The system of claim 9, further comprising:
a backup storage system (BSS) comprising the first VMBI, the plurality of replica virtual machine disk sets, and the backup data repository.

11. The system of claim 10, wherein the PCS is operatively connected to the BSS, and comprises:
a second VMBI executing on a second computer processor, wherein the second VMBI is in communication with the first VMBI;
a plurality of virtual machines associated with the plurality of replica virtual machine disk sets; and
a virtual machine hypervisor (VMH) operatively connected to the second VMBI and responsible for managing the plurality of virtual machines.

12. The system of claim 11, further comprising:
a production storage system (PSS) operatively connected to the PCS,
wherein the PSS comprises:
    a plurality of virtual machine disk sets associated with the plurality of virtual machines and corresponding to the plurality of replica virtual machine disk sets; and
    a production data repository comprising a plurality of configuration objects and a plurality of disk set metadata.

13. A non-transitory computer-readable medium (CRM) comprising computer-readable program code, which when executed by a computer processor, enables the computer processor to:
receive a first restore request comprising a first virtual machine identifier (ID) associated with a first virtual machine;
identify a first replica virtual machine disk set of the plurality of replica virtual machine disk sets, a first replica configuration object of the plurality of replica configuration objects, and first replica disk set metadata of the plurality of replica disk set metadata associated with the first virtual machine ID;
identify, using the first replica disk set metadata, a first replica virtual machine disk subset of the first replica virtual machine disk set;
make a first determination that the first replica virtual machine disk subset is non-empty;
identify, based on the first determination, a first format of the first replica configuration object;
make a second determination that the first format is non-binary;
identify, based on the second determination, a first disk chain path specified in the first replica configuration object;
modify the first disk chain path to obtain a first modified replica configuration object;
generate a first restore data stream comprising the first virtual machine ID, the first replica virtual machine disk set, the first modified replica configuration object, and the first replica disk set metadata; and
provide, to a production computing system (PCS), the first restore data stream to restore the first virtual machine.

14. The non-transitory CRM of claim 13, wherein the first replica virtual machine disk subset comprises at least one system differencing disk.

15. The non-transitory CRM of claim 13, wherein the first disk chain path comprises a linked chain of disk references, wherein each disk reference pertains to a different virtual machine disk of a first virtual machine disk set, wherein the first replica virtual machine disk set comprises at least a subset of virtual machine disks specified in the first virtual machine disk set.

16. The non-transitory CRM of claim 13, wherein, to modify the first disk chain path, the computer-readable program code, which when executed by the computer processor, enables the computer processor to:
identify, using the first replica disk set metadata, at least one disk reference associated with at least one system differencing disk specified in the first disk chain path; and
remove the at least one disk reference from the first disk chain path to obtain a first modified disk chain path,
wherein the first modified disk chain path comprises a linked chain of disk references comprising a first disk reference associated with an original disk.

17. The non-transitory CRM of claim 16, wherein the linked chain of disk references further comprises at least one other disk reference associated with at least one user differencing disk.

18. The non-transitory CRM of claim 13, wherein the first format is extensible markup language (XML).

19. The non-transitory CRM of claim 13, further comprising computer-readable program code, which when executed by the computer processor, enables the computer processor to:
receive a second restore request comprising a second virtual machine ID associated with a second virtual machine;
identify a second replica virtual machine disk set, a second replica configuration object, and second replica disk metadata associated with the second virtual machine ID;
identify, using the second replica disk metadata, a second replica disk subset of the second replica disk set;
make a third determination that the second replica disk subset is non-empty;
identify, based on the third determination, a second format of the second replica configuration object;
make a fourth determination that the second format is binary;
based on the fourth determination:
    instantiate a dummy virtual machine using the second replica configuration object;
    identify, through the dummy virtual machine, a second disk chain path specified in the second replica configuration object;
    modify the second disk chain path to obtain a second modified replica configuration object;
generate a second restore data stream comprising the second virtual machine ID, the second replica virtual machine disk set, the second modified replica configuration object, and the second replica disk set metadata; and
provide, to the PCS, the second restore data stream to restore the second virtual machine.

20. The non-transitory CRM of claim 13, further comprising computer-readable program code, which when executed by the computer processor, enables the computer processor to:

receive a second restore request comprising a second virtual machine ID associated with a second virtual machine;
   identify a second replica virtual machine disk set, a second replica configuration object, and second replica disk metadata associated with the second virtual machine ID;
   identify, using the second replica disk metadata, a second replica disk subset of the second replica disk set;
   make a third determination that the second replica disk subset is empty;
   generate, based on the third determination, a second restore data stream comprising the second virtual machine ID, the second replica virtual machine disk set, the second replica configuration object, and the second replica disk set metadata; and
   provide, to the PCS, the second restore data stream to restore the second virtual machine.

\* \* \* \* \*